(12) United States Patent
Sasakawa et al.

(10) Patent No.: US 11,456,449 B2
(45) Date of Patent: Sep. 27, 2022

(54) ELECTRODE FOR A SECONDARY BATTERY, SECONDARY BATTERY, BATTERY PACK AND VEHICLE

(71) Applicants: Kabushiki Kaisha Toshiba, Minato-ku (JP); Toshiba Infrastructure Systems & Solutions Corporation, Kawasaki (JP)

(72) Inventors: Tetsuya Sasakawa, Yokohama (JP); Wen Zhang, Sagamihara (JP); Yasuhiro Harada, Isehara (JP); Norio Takami, Yokohama (JP)

(73) Assignees: Kabushiki Kaisha Toshiba, Minato-ku (JP); Toshiba Infrastructure Systems & Solutions Corporation, Kawasaki (JP)

( * ) Notice: Subject to any disclaimer, the term of this patent is extended or adjusted under 35 U.S.C. 154(b) by 71 days.

(21) Appl. No.: 16/523,052

(22) Filed: Jul. 26, 2019

(65) Prior Publication Data

US 2020/0044235 A1     Feb. 6, 2020

(30) Foreign Application Priority Data

Aug. 2, 2018   (JP) .............................. JP2018-145916
May 30, 2019   (JP) .............................. JP2019-101796

(51) Int. Cl.
    H01M 4/131     (2010.01)
    H01M 10/052     (2010.01)
    *H01M 4/02*     (2006.01)

(52) U.S. Cl.
    CPC ......... H01M 4/131 (2013.01); H01M 10/052 (2013.01); *H01M 2004/027* (2013.01); *H01M 2004/028* (2013.01); *H01M 2220/20* (2013.01)

(58) Field of Classification Search
    CPC .... H01M 4/485; H01M 2/1016; H01M 4/366; H01M 4/131; H01M 2004/027;
(Continued)

(56) References Cited

U.S. PATENT DOCUMENTS 8,012,627 B2   9/2011   Takami et al.
8,114,469 B2 *   2/2012   Zaghib ................ H01M 4/0471
                                                        427/122
(Continued)

FOREIGN PATENT DOCUMENTS

CN     104078663     10/2014
CN     106848284     6/2017
(Continued)

OTHER PUBLICATIONS

Kaiqiang Wu et al., Phase composition and electrochemical performance of sodium lithium titanates as anode materials for lithium rechargeable batteries, 2015, Journal of Power Sources, vol. 275, pp. 419-428. (Year: 2015).*

(Continued)

*Primary Examiner* — Helen Oi K Conley
(74) *Attorney, Agent, or Firm* — Oblon, McClelland, Maier & Neustadt, L.L.P.

(57) ABSTRACT

An electrode for a secondary battery comprises a current collector; and an active material-containing layer has active materials which comprise titanium-containing composite oxide having an orthorhombic crystal structure and represented by a general formula $Li_{2+a}M1_{2-b}Ti_{6-c}M2_dO_{14+\delta}$; wherein the active material-containing layer has intensity ratio Ia/Ib in an X-ray diffraction pattern of the active material-containing layer, the Ia and the Ib are obtained by powder X-ray diffraction method using Cu-K$\alpha$ ray, the intensity ratio is within a range of $0.5 \leq Ia/Ib \leq 2$, the Ia is the strongest intensity of a diffraction peak among diffraction (Continued)

peaks appearing within a range of $42°≤2θ≤44°$, and the Ib is the strongest intensity of a diffraction peak among diffraction peaks appearing within a range of $44°<2θ≤48°$.

(M1 is at least one selected from the group consisting of Sr, Ba, Ca, Mg, Na, Cs, Rb and K, M2 is at least one selected from the group consisting of Zr, Sn, V, Nb, Ta, Mo, W, Y, Fe, Co, Cr, Mn, Ni and Al a is within a range of $0≤a≤6$
b is within a range of $0≤b<2$
c is within a range of $0≤c<6$
d is within a range of $0≤d<6$
δ is within a range of $-0.5≤δ≤0.5$.)

20 Claims, 6 Drawing Sheets

(58) Field of Classification Search
CPC ............ H01M 4/5825; H01M 4/625; H01M 10/0525; H01M 10/052; H01M 2004/028; H01M 2220/20; C01G 39/006; C01G 33/006; C01G 31/006; C01G 35/006; C01G 25/006; C01G 23/006; C01G 23/001; C01G 23/002; C01G 23/005; Y02E 60/122; Y02E 60/10; C01P 2002/74; C01P 2002/72; C01P 2002/76; C01P 2006/12; C01P 2006/40
See application file for complete search history.

(56) References Cited

U.S. PATENT DOCUMENTS

| | | | |
|---|---|---|---|
| 8,168,331 B2* | 5/2012 | Best | H01M 4/5815 429/231.95 |
| 2009/0042095 A1* | 2/2009 | Inagaki | H01M 4/364 429/92 |
| 2012/0097890 A1 | 4/2012 | Van Thournout et al. | |
| 2012/0270093 A1* | 10/2012 | Isozaki | C01G 53/50 429/156 |
| 2017/0271662 A1 | 9/2017 | Harada et al. | |
| 2017/0271664 A1 | 9/2017 | Harada et al. | |

FOREIGN PATENT DOCUMENTS

| | | | |
|---|---|---|---|
| CN | 107204441 | 9/2017 | |
| EP | 3 051 612 B1 | 7/2017 | |
| JP | 06-58848 A | 3/1994 | |
| JP | 09-199179 A | 7/1997 | |
| JP | 3555124 B2 | 8/2004 | |
| JP | 2005-123183 A | 5/2005 | |
| JP | 2005267940 A * | 9/2005 | ............ Y02E 60/10 |
| JP | 5404906 B2 | 2/2014 | |
| JP | 2016-216304 A | 12/2016 | |
| JP | 6058848 | 12/2016 | |
| JP | 2017-168264 A | 9/2017 | |
| JP | 2017-168320 A | 9/2017 | |
| WO | WO 2017/073765 A1 | 5/2017 | |

OTHER PUBLICATIONS

Luo et al., Lithiation-delithiation kinetics of BaLi2Ti6O14 anode in high-performance secondary Li-ion batteries, 2017 Jornal of Electroanalytical Chemistry 786, pp. 86-93 (Year: 2017).*

Office Action dated May 31, 2022, in Chinese Patent Application No. 201910699309.7.

Wu et al., "Phase composition and electrochemical performance of sodium lithium titanates as anode materials for lithium rechargeable batteries", Journal of Power Sources, vol. 275, pp. 419-428 (2015).

* cited by examiner

ELECTRODE FOR A SECONDARY BATTERY, SECONDARY BATTERY, BATTERY PACK AND VEHICLE

CROSS-REFERENCE TO RELATED APPLICATIONS

This application is based upon and claims the benefit of priority from the prior Japanese Patent Application No. 2018-145916, filed on Aug. 2, 2018 and the prior Japanese Patent Application No. 2019-101796, filed on May 30, 2019, the entire contents of which are incorporated herein by reference Field Embodiments of the present invention relate to an electrode for a secondary battery, a secondary battery, a battery pack and a vehicle.

DESCRIPTION OF THE RELATED ART

High capacity, long service life, and high output have been further required, as an in-car application and a stationary application with respect to a lithium ion battery as progressed. A lithium titanium composite oxide has a small volume change due to charge and discharge, and thus, is excellent in a cycle characteristic. In addition, in a lithium storing and releasing reaction of the lithium titanium composite oxide, it is difficult for a lithium metal to be precipitated, in principle, and thus, in a battery using the lithium titanium composite oxide, performance degradation is small even in a case where the charge and discharge is repeated at a large current.

In a titanium-containing composite oxide having a crystalline structure belonging to a space group Cmca or a space group Fmmm, a storing and releasing reaction of Li progresses at a potential of approximately 1.2 V to 1.5 V (vs. Li/Li+). For this reason, a secondary battery including a negative electrode using such a titanium-containing composite oxide, is an excellent secondary battery capable of exhibiting a battery voltage higher than that of a secondary battery containing lithium titanate. However, the titanium-containing composite oxide having the crystalline structure belonging to the space group Cmca or the space group Fmmm, is poor in Li ion conductivity, and thus, there is a room for improvement in input and output performance such as large-current performance.

CITATION LIST

Patent Document

Patent Document 1: JP 2005-123183 A
Patent Document 2: JP 9-199179 A
Patent Document 3: JP 2017-168320 A

Non-Patent Document

Non-Patent Document 1: Actual Powder X-Ray Analysis, edited by Izumi NAKAI and Fujio IZUMI in Conference on X-Ray Analytic Study of The Japan Society for Analytical Chemistry (published by Asakura Publishing Co., Ltd.)

SUMMARY

An object of the invention is to provide an electrode for a secondary battery, capable of realizing a secondary battery having more excellent input and output properties at a high voltage, a secondary battery, a battery pack, and a vehicle.

According to a first embodiment, an electrode for a secondary battery comprises a current collector; and an active material-containing layer has active materials which comprise titanium-containing composite oxide having an orthorhombic crystal structure and represented by a general formula $Li_{2+a}M1_{2-b}Ti_{6-c}M2_dO_{14+\delta}$; wherein the active material-containing layer has intensity ratio Ia/Ib in an X-ray diffraction pattern of the active material-containing layer, the Ia and the Ib are obtained by powder X-ray diffraction method using Cu-Kα ray, the intensity ratio is within a range of $0.5 \leq Ia/Ib \leq 2$, the Ia is the strongest intensity of a diffraction peak among diffraction peaks appearing within a range of $42° \leq 2\theta \leq 44°$, and the Ib is the strongest intensity of a diffraction peak among diffraction peaks appearing within a range of $44° < 2\theta \leq 48$.

(M1 is at least one selected from the group consisting of Sr, Ba, Ca, Mg, Na, Cs, Rb and K, M2 is at least one selected from the group consisting of Zr, Sn, V, Nb, Ta, Mo, W, Y, Fe, Co, Cr, Mn, Ni and Al
a is within a range of $0 \leq a \leq 6$
b is within a range of $0 \leq b < 2$
c is within a range of $0 \leq c < 6$
d is within a range of $0 \leq d < 6$
δ is within a range of $-0.5 \leq \delta \leq 0.5$.)

BRIEF DESCRIPTION OF THE DRAWINGS

FIGS. 2a and 2h are crystalline structure conceptual diagrams of a titaniwn-containing composite oxide having a crystalline structure belonging to a space group Cmca or a space group Fmmm;

DETAILED DESCRIPTION

Figure 1:
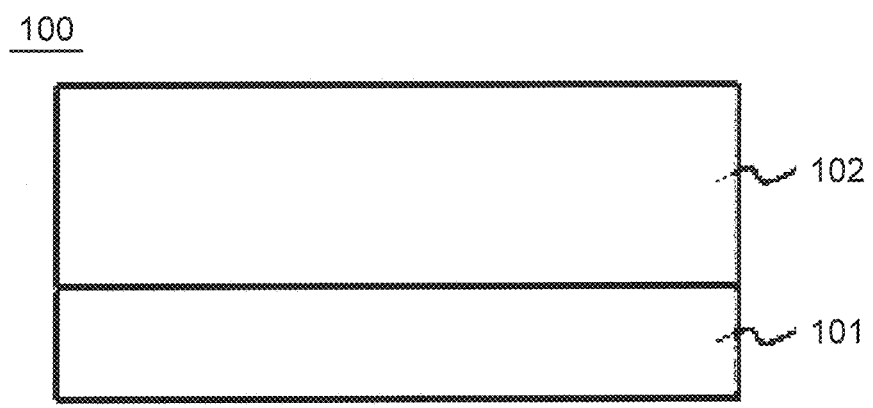
FIG. 1 is a sectional conceptual diagram of an electrode for a secondary battery according to a first embodiment.

Hereinafter, embodiments will be described with reference to the drawings. Furthermore, in the embodiments, the same reference numerals are applied to common configurations, and the repeated description will be omitted. In addition, each of the drawings is a schematic view for prompting the description of the embodiments, and the understanding thereof, and a shape or a dimension, a ratio, and the like may be different from those of an actual device, but can be suitably design-changed in consideration of the following description and a known technology.

First Embodiment

An electrode for a secondary battery according to a first embodiment, is an electrode for a secondary battery, including a collector, and an active material mixture layer that is formed on a front surface of the collector, and contains a titanium-containing composite oxide having at least an orthorhombic crystalline structure, represented by a general formula of $Li_{2+a}M1_{2-b}Ti_{6-c}M2_dO_{14+\delta}$, as an active material, in which an intensity ratio Ia/Ib of a peak intensity Ia of a diffraction ray of the highest intensity in diffraction rays appearing in a range of $42° \leq 2\theta \leq 44°$ of an X-ray diffraction diagram that is obtained by a powder X-ray diffraction method using a Cu-Kα ray of the active material mixture layer, to a peak intensity Ib of a diffraction ray of the highest intensity in diffraction rays appearing in a range of $44° < 2\theta \leq 48°$, is $0.5 \leq Ia/Ib \leq 2$.

Here, M1 is at least one type selected from the group consisting of Sr, Ba, Ca, Mg, Na, Cs, Rb, and K, M2 is at least one type selected from the group consisting of Zr, Sn, V, Nb, Ta, Mo, W, Y, Fe, Co, Cr, Mn, Ni, and Al, a is in a range of $0 \leq a \leq 6$, b is in a range of $0 \leq b < 2$, c is in a range of $0 \leq c < 6$, d is in a range of $0 \leq d < 6$, and δ is in a range of $-0.5 \leq \delta \leq 0.5$.

FIG. 1 illustrates a sectional conceptual diagram of the electrode for a secondary battery according to the first embodiment. The electrode 100 for a secondary battery of FIG. 1, includes a collector 101, and an active material mixture layer 102 that is formed on one surface of the collector 101. The electrode 100 for a secondary battery according to this embodiment, can be used in both of a negative electrode and a positive electrode. For this reason, the collector 101 is a negative electrode collector or a positive electrode collector. The active material mixture layer 102 is a negative electrode layer or a positive electrode layer. The active material mixture layer 102 is capable of containing an active material, a conductive agent, and a binding material. The active material contains at least a titanium-containing composite oxide, and is capable of containing one or more types of other active materials, in the case of being used in the negative electrode and in the case of being used in the positive electrode.

Furthermore, the electrode collector, the active material mixture layer, and the active material that can be included when the electrode for a secondary battery according to this embodiment, is used as the negative electrode and the positive electrode, will be described below in detail.

In the active material contained in the electrode for a secondary battery according to this embodiment, it is preferable that a specific surface area is greater than or equal to 0.5 m²/g and less than or equal to 50 m²/g, regardless of the negative electrode or the positive electrode. In a case where the specific surface area is greater than or equal to 0.5 m²/g, it is possible to sufficiently ensure a storing and desorbing site of a Li ion. In a case where the specific surface area is less than or equal to 50 m²/g, handleability on industrial production increases. It is more preferable that the specific surface area is greater than or equal to 3 m²/g and 30 m²/g.

In addition, in the active material contained in the electrode for a secondary battery according to this embodiment, a layer having carbon in at least a part of a front surface of particles, may be formed, regardless of the negative electrode or the positive electrode. The active material further includes the layer having carbon, and thus, is capable of exhibiting more excellent electron conductivity. It is preferable that the amount of carbon is in a range of greater than or equal to 0.1 mass % and less than or equal to 10 mass %, with respect to the mass of the active material. According to such a range, an effect of increasing electron conduction is obtained, while sufficiently ensuring the capacity. It is more preferable that a carbon content is greater than or equal to 1 mass % and less than or equal to 3 mass %, with respect to the mass of the active material. The amount of carbon, for example, can be quantitatively determined by a high frequency heating-infrared absorption method.

The titanium-containing composite oxide represented by a general formula of $Li_{2+a}M1_{2-b}Ti_{6-c}M2_dO_{14}+b$, has a layered crystalline structure belonging to a space group Cmca or a space group Fmmm. Li ion conductivity in the titanium-containing oxide, depends on aligning properties of the titanium-containing composite oxide.

In the electrode for a secondary battery according to this embodiment, the titanium-containing composite oxide contained as the active material, has aligning properties in which dispersion resistance of ions in an active material solid is low, and thus, it is possible to realize the secondary battery having excellent input and output properties at a high voltage. The fact that the titanium-containing composite oxide has the aligning properties in which the dispersion resistance of the ions in the solid is low, indicates the followings.

Figures 2A, 2B:
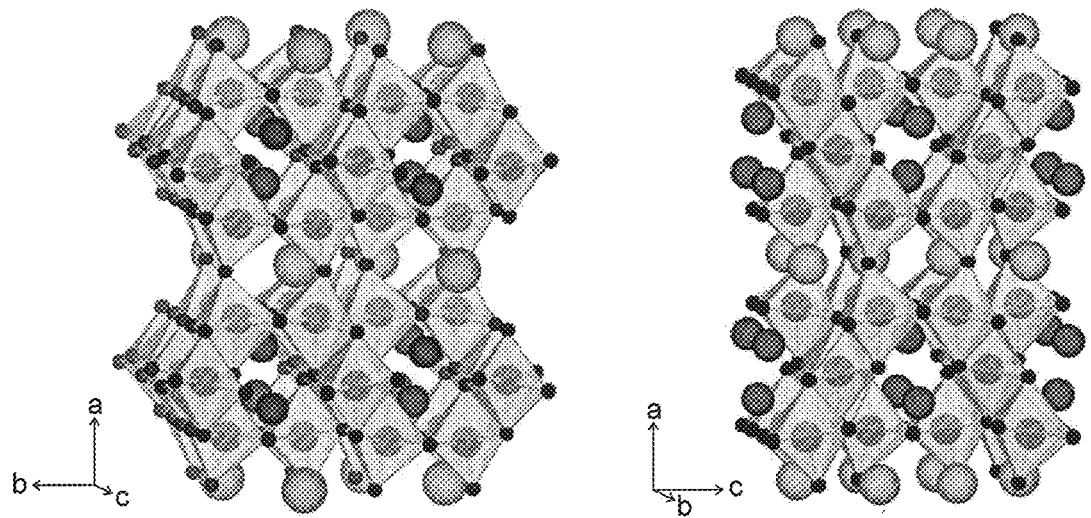

FIG. 2 is a crystalline structure conceptual diagram of the titanium-containing composite oxide having the crystalline structure belonging to the space group Cmca or the space group Fmmm. FIG. 2a is a crystalline structure conceptual diagram of the titanium-containing composite oxide belonging to the space group Cmca, and FIG. 2b is a crystalline structure conceptual diagram of the titanium-containing composite oxide belonging to the space group Fmmm. In the crystalline structure of the titanium-containing composite oxide particles belonging to the space group Cmca or Fmmm, a skeleton structure portion that is formed of titanium ions and oxide ions, and is stabilized, is alternately arranged two-dimensionally in a main axis direction, and a space that is the host of the lithium ions, is formed in an interlayer portion. The titanium-containing composite oxide having the crystalline structure belonging to the space group Cmca or the space group Fmmm, indicates a titanium-containing composite oxide having a grain shape in which the main axis direction is set to a short axis, and a direction vertical to the main axis is set to a long axis. Furthermore, hereinafter, titanium-containing composite oxide particles having a grain shape in which the main axis direction is set to the short axis, and the direction vertical to the main axis is set to the long axis, will be referred to as flat particles.

When ions are dispersed in the titanium-containing composite oxide having such a space group, the ions pass through the layers. For this reason, an ion conductance of the titanium-containing composite oxide of the flat particles tends to be high in the direction vertical to the main axis, and tends to be low in the main axis direction.

The electrode for a secondary battery according to this embodiment contains the flat particles, and thus, it is possible to reduce resistance according to ion dispersion in the titanium-containing composite oxide. Accordingly, in the secondary battery using the electrode for a secondary battery according to this embodiment containing the titanium-containing composite oxide of the flat particles, it is possible to realize the secondary battery having excellent input and output properties at a high voltage.

It is not necessary that the long axis of the flat particles on the front surface of the electrode collector is aligned in a direction completely parallel to the electrode collector, and the long axis of the flat particles may have an angle on the front surface of the electrode collector.

The short axis of the flat particles is easily aligned in the direction vertical to the electrode surface, in the electrode, as an aspect ratio of the flat particles increases. The short axis of the flat particles is aligned in the direction vertical to the electrode surface, and thus, it is possible to align the direction of an ion dispersion path in the active material solid, and to further reduce ion dispersion resistance in the electrode. For this reason, it is preferable that the short axis of the flat particles is aligned in a direction vertical to an electrode surface.

The alignment of the titanium-containing composite oxide in the electrode for a secondary battery according to this embodiment, can be confirmed by calculating an intensity ratio of an X-ray diffraction diagram that is obtained by performing powder X-ray diffraction using a Cu-Kα ray with respect to the electrode for a secondary battery.

For example, in the powder X-ray diffraction diagram using the Cu-Kα ray, the titanium-containing composite oxide having the crystalline structure belonging to the space group Fmmm, represents a diffraction peak corresponding to diffraction on a plane indicated as (800) by using a mirror index, in a range of $42° \leq 2\theta \leq 44\theta$, and represents a diffraction peak corresponding to diffraction on a (024) plane, in a range of $44° < 2\theta \leq 48°$. When the peak intensity of the diffraction ray having the highest intensity, in the diffraction rays appearing in the range of $42° \leq 2\theta \leq 44°$, is set to Ia, and the peak intensity of the diffraction ray the highest intensity, in the diffraction rays appearing in the range of $44° < 2\theta \leq 48°$, is set to Ib, the intensity ratio Ia/Ib in the X-ray diffraction diagram of the electrode for a secondary battery, in which the active material is not aligned, indicates a value of greater than 0.4 and less than 0.5.

Next, in a case where the main axis direction of the titanium-containing composite oxide such as the flat particles is aligned in the short axis, and the direction vertical to the main axis is aligned in the long axis, the degree of alignment of the titanium-containing composite oxide in the electrode increases. An intensity ratio Ia/Ib increases as the degree of alignment increases. For this reason, the electrode for a secondary battery according to this embodiment is analyzed by a powder X-ray diffraction method using a Cu-Kα ray, and in an X-ray diffraction diagram obtained by the analysis, the intensity ratio Ia/Ib is $0.5 \leq Ia/Ib \leq 2$, and thus, it is known that the short axis of the titanium-containing composite oxide is aligned in the main axis direction.

In a case where the intensity ratio Ia/Ib is greater than 2, in the electrode, the ion dispersion in the electrolyte is hindered by the flat particles, and the ion conductance decreases. In a case where the intensity ratio Ia/Ib is less than 0.5, it is not possible to sufficiently reduce the dispersion resistance in the active material solid, and the ion conductance in the electrode decreases.

In addition, it is more preferable that the intensity ratio Ia/Ib is in a range of $0.8 \leq Ia/Ib \leq 1.2$. This is because it is possible to make a high ion conductance compatible between the active material solid and the electrolyte, according to such a range.

The same applies to the titanium-containing composite oxide having the crystalline structure belonging to the space group Cmca. A specific measurement method will be described in detail in examples.

The titanium-containing composite oxide that is the flat particles contained in the electrode for a secondary battery according to this embodiment, can be obtained by cleaving the particles, for example, by a hammer mill, after being calcined. Describing a production method in detail, first, a lithium salt such as lithium hydroxide, lithium oxide, and lithium carbonate, is prepared as a Li source. In a case where a titanium-containing composite oxide having sodium is synthesized, a sodium salt such as sodium hydroxide, sodium oxide, and sodium carbonate, is prepared as a Na source. For example, in a case where a titanium-containing composite oxide represented by a composition formula of $Li_2Na_2Ti_6O_{14}$ is synthesized, the Li source, the Na source, and the titanium oxide are weighed such that an atomic ratio of lithium, sodium, and titanium is 2:2:6. It is preferable that the mixture described above, is subjected to press molding into the shape of a pallet. According to the press molding, a contact area between raw materials increases, and thus, it is possible to accelerate a reaction. Next, the mixture subjected to the press molding, for example, is calcined in a temperature condition of higher than or equal to 1000° C. and lower than or equal to 1200° C., for example, for longer than or equal to 1 hour and shorter than or equal to 24 hours. A calcined product, for example, is cleaved by a hammer mill, and thus, the flat particles are obtained. In a case where a calcining temperature is excessively low or a calcining time is excessively short, the crystallinity of the particles does not sufficiently increase, and thus, the particles are not cleaved, or the aspect ratio of the flat particles does not tend to sufficiently increase. In addition, in a case where the calcining temperature is excessively high or the calcining time is excessively long, a particle size after being calcined excessively increases, and thus, the aspect ratio of the flat particles excessively increases.

Thus, in the electrode for a secondary battery according to this embodiment, the titanium-containing composite oxide is formed into the flat particles, and thus, it is possible to reduce the ion dispersion resistance in the active material solid, and to realize the secondary battery having more excellent input and output properties at a high voltage.

A measurement method of the active material contained in the electrode for a secondary battery according to this embodiment, will be described below.

According to the first embodiment described above, the electrode for a secondary battery is provided. The electrode for a secondary battery is the electrode for a secondary battery, including the collector, and the active material mixture layer that is formed on the front surface of the collector, and contains the titanium-containing composite oxide having at least the orthorhombic crystalline structure, represented by the general formula of $Li_{2+a}M1_{2-b}Ti_{6-c}M2_dO_{14+\delta}$, as the active material, in which the intensity ratio Ia/Ib of the peak intensity Ia of the diffraction ray having the highest intensity in the diffraction rays appearing in the range of $42° \leq 2\theta \leq 44°$ of the X-ray diffraction diagram that is obtained by the powder X-ray diffraction method using the Cu-Kα ray of the active material mixture layer, to the peak intensity Ib of the diffraction ray having the highest intensity in the diffraction rays appearing in the range of $44° < 2\theta \leq 48°$, is $0.5 \leq Ia/Ib \leq 2$. Here, M1 is at least one type selected from the group consisting of Sr, Ba, Ca, Mg, Na, Cs, Rb, and K, M2 is at least one type selected from the group consisting of Zr, Sn, V, Nb, Ta, Mo, W, Y, Fe, Co, Cr, Mn, Ni, and Al, a is in the range of $0 \leq a \leq 6$, b is in the range of $0 \leq b < 2$, c is in the range of $0 \leq c < 6$, d is in the range of $0 \leq d < 6$, and δ is in the range of $-0.5 \leq \delta \leq 0.5$. Therefore, it is possible to realize the secondary battery having more excellent input and output properties at a high voltage.

Second Embodiment

According to a second embodiment, a secondary battery is provided. The secondary battery includes the positive electrode, the negative electrode, and an electrolyte. In the secondary battery according to the second embodiment, the electrode for a secondary battery according to the first embodiment, can be used in at least one of the positive electrode and the negative electrode.

The secondary battery according to the second embodiment is capable of further including a separator between the positive electrode and the negative electrode. The positive electrode, the negative electrode, and the separator are capable of configuring an electrode group. The electrolyte can be retained in the electrode group.

The electrode group, for example, is capable of having a laminated structure. In the laminated electrode group, a plurality of positive electrodes and a plurality of negative electrodes are alternately laminated through the separator.

Alternatively, the electrode group is capable of having a wound structure. The wound electrode group can be formed by winding a laminated body in which the positive electrode, the separator, and the negative electrode are laminated.

The secondary battery according to the second embodiment may further include an exterior material in which the electrode group and the electrolyte are stored, a negative electrode terminal, and a positive electrode terminal.

The positive electrode and the negative electrode can be spatially separated from each other through the separator. The negative electrode terminal can be electrically connected to the negative electrode. The positive electrode terminal can be electrically connected to the positive electrode.

Hereinafter, the exterior material, the negative electrode, the positive electrode, the electrolyte, the separator, the positive electrode terminal, and the negative electrode terminal will be described in detail.

1) Exterior Material

The exterior material, for example, is formed of a laminated film having a thickness of less than or equal to 0.5 mm. Alternatively, the exterior material, for example, may be a metallic container having a thickness of less than or equal to 1.0 mm. It is more preferable that the thickness of the metallic container is less than or equal to 0.5 mm.

The shape of the exterior material, for example, can be selected from a flat shape (a thin shape), a rectangular shape, a tubular shape, a coin shape, and a button shape. Examples of the exterior material include an exterior material for a small-size battery, mounted on a portable electronic device or the like, an exterior material for a large-size battery, mounted on a vehicle such as an automobile of two wheels to four wheels, and the like, according to a battery dimension.

A multi-layer film in which a metal layer is interposed between resin layers, is used in the laminated film. In order for a reduction in the weight, an aluminum foil or an aluminum alloy foil is preferable as the metal layer. For example, a polymer material such as polypropylene (PP), polyethylene (PE), nylon, and polyethylene terephthalate (PET), can be used in the resin layer. The laminated film can be molded into the shape of the exterior material, by being sealed according to thermal fusion bonding.

The metallic container, for example, is formed of aluminum, an aluminum alloy, or the like. It is preferable that the aluminum alloy is an alloy having an element such as magnesium, zinc, and silicon. In a case where the alloy has a transition metal such as iron, copper, nickel, and chromium, it is preferable that the amount of transition metal is less than or equal to 100 mass ppm.

2) Negative Electrode

The negative electrode is capable of including the negative electrode collector, and the negative electrode layer formed on one surface or both surfaces of the negative electrode collector.

It is preferable that the negative electrode collector is an aluminum foil that is electrochemically stabilized in a potential range nobler than 1 V (vs. $Li/Li^+$), or an aluminum alloy foil having an element such as Mg, Ti, Zn, Mn, Fe, Cu, and Si. The aluminum foil or the aluminum alloy foil is capable of preventing the dissolution of the negative electrode collector and corrosion degradation at an overdischarge cycle.

The thickness of the aluminum foil and the aluminum alloy foil is less than or equal to 20 μm, and is more preferably less than or equal to 15 μm. It is preferable that the purity of the aluminum foil is greater than or equal to 99%. An alloy having an element such as magnesium, zinc, and silicon, is preferable as the aluminum alloy. On the other hand, it is preferable that the content of the transition metal such as iron, copper, nickel, and chromium, is less than or equal to 1%.

The negative electrode layer is capable of containing a negative electrode active material, the conductive agent, and the binding agent. Only one type or two or more types of active materials may be contained in the negative electrode active material. The negative electrode active material will be described below in detail.

The conductive agent is capable of increasing collection performance of the negative electrode active material, and of suppressing contact resistance with respect to the collector. For example, a carbon material, a metal powder such as an aluminum powder, and conductive ceramics such as TiO, can be used as the conductive agent. Examples of the carbon material include acetylene black, carbon black, coke, a carbon fiber, and black lead. Coke of which a thermal treatment temperature is 800° C. to 2000° C., and an average particle diameter is less than or equal to 10 μm, black lead, a powder of TiO, and a carbon fiber having an average particle diameter of less than or equal to 1 μm, are more preferable. It is preferable that a BET specific surface area according to $N_2$ adsorption of the carbon material, is greater than or equal to 10 $m^2/g$.

The binding agent is capable of binding the negative electrode active material and the conductive agent together. Examples of the binding agent include polytetrafluoroethylene (PTFE), polyvinylidene fluoride (PVdF), an acrylic resin, fluorine-based rubber, and styrene butadiene rubber.

It is preferable that the negative electrode active material, the conductive agent, and the binding agent in the negative electrode layer are compounded respectively at a ratio of greater than or equal to 70 mass % and less than or equal to 96 mass %, a ratio of greater than or equal to 2 mass % and less than or equal to 28 mass %, and a ratio of greater than or equal to 2 mass % and less than or equal to 28 mass %. The amount of the conductive agent is set to be greater than or equal to 2 mass %, and thus, the collection performance of the negative electrode layer is improved, and large-current performance of the secondary battery can be improved. In addition, the amount of the binding agent is set to be greater than or equal to 2 mass %, and thus, the binding properties between the negative electrode layer and the collector increase, and cycle performance can be improved. On the other hand, it is preferable that the conductive agent and the binding agent are respectively set to be less than or equal to 28 mass %, from the viewpoint of high capacity.

For example, the negative electrode active material, the conductive agent, and the binding agent are suspended in a solvent that is commonly used, slurry is prepared, and the slurry is applied to the collector, is dried, and then, is pressed, and thus, the negative electrode is produced. In addition, the active material, the conductive agent, and the binding agent may be formed into the shape of a pellet to be the negative electrode layer, and the negative electrode layer may be formed on the collector, and thus, the negative electrode may be produced.

The negative electrode active material is a lithium titanium composite oxide having a spinel type structure ($Li_4Ti_5O_{12}$ or the like), lithium titanate having a ramsdellite structure ($Li_2Ti_3O_7$ or the like), monoclinic titanium dioxide ($TiO_2(B)$), a niobium-containing oxide ($Nb_2O_5$, $TiNb_2O_7$, or the like), an iron composite sulfide (FeS, $FeS_2$, or the like), anatase type titanium dioxide, rutile type titanium dioxide, a hollandite type titanium composite oxide, and the like. Only one type or two or more types of active materials may be contained in the negative electrode active material.

Examples of the titanium-containing composite oxide are capable of including a composite oxide represented by a general formula of $Li_{2+a}M1_{2-b}Ti_{6-c}M2_dO_{14+\delta}$. Here, M1 is at least one type selected from the group consisting of Sr, Ba, Ca, Mg, Na, Cs, Rb, and K, M2 is at least one type selected from the group consisting of Zr, Sn, V, Nb, Ta, Mo, W, Y, Fe, Co, Cr, Mn, Ni, and Al, a is in a range of 0≤a≤6, b is in a range of 0≤b<2, c is in a range of 0≤c<6, d is in a range of 0≤d<6, and δ is in a range of −0.5≤δ≤0.5.

In a case where the electrode for a secondary battery according to the first embodiment, is used as the negative electrode, the negative electrode active material contains the titanium-containing composite oxide having at least one of the crystalline structure belonging to the space group Cmca and the crystalline structure belonging to the space group Fmmm, represented by the general formula of $Li_{2+a}M1_{2b}Ti_{6-6}M2_dO_{14+\delta}$. For this reason, the titanium-containing composite oxide, may only have the crystalline structure belonging to the space group Cmca, or may only have the crystalline structure belonging to the space group Fmmm. Alternatively, the titanium-containing composite oxide is capable of having both of the crystalline structure belonging to the space group Cmca and the crystalline structure belonging to the space group Fmmm. Further, the titanium-containing composite oxide may have a crystalline structure belonging to a space group different from the space groups described above, in addition to the crystalline structure belonging to the space groups. In addition, the titanium-containing composite oxide having at least one of the crystalline structure belonging to the space group Cmca and the crystalline structure belonging to the space group Fmmm may be independently used in the negative electrode active material, or one or more types of negative electrode active materials described above may be simultaneously used as the other negative electrode active material.

The negative electrode active material, for example, may be primary particles, or may be secondary particles in which the primary particles are aggregated.

It is preferable that the negative electrode active material is in the form of primary particles, from the viewpoint of the service life performance. In the form of secondary particles, there is a concern that the secondary particles collapse according to a volume change of the negative electrode active material, and the service life performance decreases. In addition, in the case of containing the secondary particles, it is preferable that an average secondary particle diameter of the secondary particles is greater than or equal to 1 μm and less than or equal to 100 μm. In a case where the average particle diameter of the secondary particles is in such a range, the handleability on the industrial production increases, and in a coating film for producing an electrode, it is possible to make the mass and the thickness homogeneous. Further, it is possible to prevent a decrease in surface smoothness of the electrode. It is more preferable that the average particle diameter of the secondary particles is greater than or equal to 3 μm and less than or equal to 30 μm.

It is possible to confirm whether or not the negative electrode active material contains the secondary particles, for example, according to the observation with a scanning electron microscope (SEM).

It is preferable that an average primary particle diameter of the primary particles contained in the secondary particles is greater than or equal to 100 nm and less than or equal to 5 μm. In a case where the average primary particle diameter is in such a range, the handleability on the industrial production increases, and it is possible to accelerate the diffusion of Li ions in a solid of the titanium-containing composite oxide. It is more preferable that the average primary particle diameter is greater than or equal to 300 nm and less than or equal to 1 μm.

The primary particles may be in an isotropic shape in which an aspect ratio is less than or equal to 3, or for example, in the shape of a sphere.

In addition, in a case where the electrode for a secondary battery according to the first embodiment is used as the negative electrode, the primary particles of the titanium-containing composite oxide having at least one of the crystalline structure belonging to the space group Cmca and the crystalline structure belonging to the space group Fmmm, may be only in the flat particles, or may be in other shape, for example, the shape of a sphere.

It is preferable that a specific surface area of the negative electrode active material, measured by a BET method, is greater than or equal to 3 $m^2/g$ and less than or equal to 50 $m^2/g$. In a case where the specific surface area is greater than or equal to 3 $m^2/g$, it is possible to sufficiently ensure a storing and desorbing site of a Li ion. In a case where the specific surface area is less than or equal to 50 $m^2/g$, the handleability on the industrial production increases. Furthermore, a measurement method of the specific surface area according to the BET method, will be described below.

The negative electrode active material is capable of further having impurities unavoidable for manufacturing in the amount of less than or equal to 1000 mass ppm, in addition to the M1 element and the M2 element described above, and carbons.

[Confirmation Method of Negative Electrode Active Material]

Next, a confirmation method of the crystalline structure and the composition of the negative electrode active material will be described. Examples of the confirmation method include a confirmation method of the crystalline structure, a confirmation method of aligning properties in the electrode, a confirmation method of the composition of the active material, a measurement method of the amount of carbon, a measurement method of the average particle diameter of the secondary particles, a confirmation method of the average particle diameter of the primary particles, and a measurement method of the specific surface area, and such methods will be described.

Furthermore, in a case where the negative electrode active material is incorporated in a battery, for example, it is possible to take out the negative electrode active material as follows. First, the battery is set in a stage of discharge. For example, the battery is discharged to a rated final voltage at a current of 0.1 C in an environment of 25° C., and thus, it is possible to set the battery to be in the stage of discharge. Next, the battery in the stage of discharge is disassembled, and the electrode (for example, the negative electrode) is taken out. The taken electrode, for example, is washed with methyl ethyl carbonate.

The washed electrode is suitably subjected to a process or a treatment according to each of the measurement methods, and is set to a measurement sample. For example, in powder X-ray diffraction measurement, as described below, the washed electrode is cut to have approximately the same area as that of a holder of a powder X-ray diffraction device, and is set to a measurement sample.

In addition, the negative electrode active material is extracted from the electrode, as necessary, and is set to a measurement sample. For example, as described below, in a case where a carbon content in the negative electrode active material is measured, first, as described above, the washed electrode is put into water, and the active material mixture layer is deactivated in water. The negative electrode active material can be extracted from the deactivated electrode by using a centrifugal separation device or the like. In an extraction treatment, for example, in a case where polyvinylidene fluoride (PVdF) is used in the binding agent, a binding agent component is removed by being washed with N-methyl-2-pyrrolidone (NMP) or the like, and then, the conductive agent is removed with a mesh having a suitable sieve opening. In a case where such components slightly remain, the components may be removed by a heating treatment in the atmosphere (for example, at 250° C. for 30 minutes).

<Confirmation Method of Crystalline Structure of Negative Electrode Active Material and Aligning Properties in Electrode>

First, a confirmation method of the crystalline structure of the negative electrode active material and aligning properties in the electrode, will be described.

The crystalline structure of the negative electrode active material and the aligning properties in the electrode can be confirmed according to powder X-ray diffraction (XRD) analysis.

The powder X-ray diffraction measurement of the negative electrode active material in the electrode for a secondary battery according to this embodiment, will be performed as follows. First, the electrode is taken out from the secondary battery, according to the procedure described above. The electrode that is taken out and washed, is cut to have approximately the same area as that of the holder of the powder X-ray diffraction device, and is set to a measurement sample.

The obtained measurement sample is directly pasted to a glass holder, and measurement is performed. At this time, the position of a peak derived from an electrode substrate such as a metal foil, is measured in advance. Here, it is necessary that an X-ray diffraction (XRD) pattern to be obtained, can be applied to Rietveld analysis. In order to collect Rietveld data, a step width is set to be ⅓ to ⅕ of the minimum half width of a diffraction peak, and a measurement time or an X-ray intensity is suitably adjusted such that an intensity in a peak position of reflection of the highest intensity, is greater than or equal to 5000 cps.

The XRD pattern obtained as described above, is analyzed by a Rietveld method. In the Rietveld method, a diffraction pattern is calculated from a crystalline structure model assumed in advance. By fitting all of the calculated values and the actually measured values, parameters relevant to a crystalline structure (a lattice constant, an atomic coordinate, an occupancy, and the like) can be precisely analyzed. Accordingly, the characteristic of the crystalline structure of the synthesized composite oxide can be examined. In addition, it is possible to examine the occupancy of a configuration element in each site. A fitting parameter S is used as a scale for estimating the degree of coincidence between the observed intensity and the calculated intensity in the Rietveld analysis. It is necessary to perform the analysis such that S is less than 1.8. In addition, it is necessary to consider a standard deviation $\sigma j$, at the time of determining the occupancy in each of the sites. Here, the fitting parameter S and the standard deviation $\sigma j$ to be defined, are assumed by a numerical expression described in "Actual Powder X-Ray Analysis", edited by Izumi NAKAI and Fujio IZUMI in Conference on X-Ray Analytic Study of The Japan Society for Analytical Chemistry (published by Asakura Publishing Co., Ltd.).

When the powder X-ray diffraction measurement is performed, the position of the peak derived from the electrode substrate such as a metal foil, is measured in advance. In addition, a peak of the other component such as the conductive agent or the binding agent, is also measured in advance.

<Confirmation Method of Composition of Negative Electrode Active Material>

The component of the negative electrode active material, for example, can be analyzed by using an inductively coupled plasma (ICP) light emission spectroscopy. At this time, the abundance ratio of each of the elements depends on the sensitivity of an analysis device to be used. Accordingly, for example, when the composition of the negative electrode active material is analyzed by using the ICP light emission spectroscopy, a numerical value of an error of a measurement device deviates from the element ratio described above.

Specifically, the measurement of the composition of the negative electrode active material incorporated in the battery by the ICP light emission spectroscopy is performed in the following procedure. First, the negative electrode is taken out from the secondary battery, and is washed, according to the procedure described above. The washed negative electrode is put into a suitable solvent, and is irradiated with an ultrasonic wave. For example, the negative electrode is put into ethyl methyl carbonate in a glass beaker, and vibrates in a ultrasonic washing machine, and thus, the negative electrode active material layer can be peeled off from the negative electrode collector. Next, reduced-pressure drying is performed, and the peeled negative electrode active material layer is dried. The obtained negative electrode active material layer is pulverized by a mortar or the like, and thus, a powder containing the negative electrode active material that is a target, a conductive aid, a binder, and the like, is obtained. The powder is dissolved with an acid, and thus, it is possible to prepare a liquid sample containing the negative electrode active material. At this time, a hydrochloric acid, a nitric acid, a sulfuric acid, hydrogen fluoride, and the like can be used as the acid. The liquid sample is used in ICP light emission spectroscopic analysis, and thus, it is possible to known the composition of the negative electrode active material.

<Measurement Method of Amount of Carbon>

The content of carbon in the negative electrode active material, for example, can be measured by a measurement device (for example, CS-444LS, manufactured by LECO JAPAN CORPORATION), after the negative electrode active material extracted from the electrode is dried at 150° C. for 12 hours, and is measured in the container, as described above.

In a case where the other negative electrode active material is contained in the electrode, the following measurement can be performed. The negative electrode active material extracted from the electrode is used in transmission electron microscopy-energy dispersive X-ray spectroscopy (TEM-EDX) measurement, a crystalline structure of each of the particles is specified by a selected area diffraction method. Particles having a diffraction pattern attributed to titanium-containing composite oxide, are selected, and the carbon content is measured. In addition, at this time, in a case where carbon mapping is acquired in EDX, it is possible to know an existence range of carbon.

<Measurement Method of Average Particle Diameter of Secondary Particles>

A measurement method of the average particle diameter of the secondary particles, is as follows. A laser diffraction type distribution measurement device (manufactured by Shimadzu Corporation SALD-300) is used as the measurement device. First, approximately 0.1 g of a sample, a surfactant, and 1 mL to 2 mL of distilled water are added to a beaker, are sufficiently stirred, and are injected to a stirring tank, and thus, a sample solution is prepared. A luminosity distribution is measured 64 times at an interval of 2 seconds, by using the sample solution, and thus, particle size distribution data is analyzed.

<Confirmation Method of Average Diameter of Primary Particles>

The average primary particle diameter can be confirmed by scanning electron microscope (SEM) observation. 10 typical particles extracted from a typical visual field are averaged, and the average primary particle diameter is determined.

<Measurement Method of Specific Surface Area>

In the measurement of the specific surface area, a method of adsorbing molecules of which an adsorption occupied area is known, on a front surface of powder particles at the temperature of liquid nitrogen, and of obtaining a specific surface area of a sample from the amount of adsorbed molecules, is used. A BET method using low temperature and low humidity physical adsorption of inert gas, is most frequently used. The BET method is a method based on BET theory that is the best-known theory as a calculation method of the specific surface area in which Langmuir theory that is monolayer adsorption theory, expands to multi-layer adsorption. The specific surface area obtained as described above, will be referred to as a BET specific surface area.

3) Positive Electrode

The positive electrode is capable of including the positive electrode collector, and the positive electrode layer formed on one surface or both surfaces of the positive electrode collector.

It is preferable that the positive electrode collector, for example, is an aluminum foil, or an aluminum alloy foil having an element such as Mg, Ti, Zn, Mn, Fe, Cu, and Si.

The positive electrode layer is capable of containing a positive electrode active material, the conductive agent, and the binding agent.

For example, an oxide, a polymer, and the like can be used as the positive electrode active material. In addition, the positive electrode active material may contain one type of the oxide, the polymer, and the like, or may contain two or more types thereof.

For example, manganese dioxide ($MnO_2$), iron oxide, copper oxide, nickel oxide, and a lithium manganese composite oxide (for example, $Li_xMn_2O_4$ or $Li_xMnO_2$) storing lithium, a lithium nickel composite oxide (for example, $Li_xNiO_2$), a lithium cobalt composite oxide ($Li_xCoO_2$), a lithium nickel cobalt composite oxide (for example, $LiNi_{1-y}Co_yO_2$), a lithium manganese cobalt composite oxide (for example, $Li_xMn_yCo_{1-y}O_2$), a lithium nickel manganese cobalt composite oxide (for example, $Li_x(Ni_aMn_bCO_c)O_2$, here, $a+b+c=1$), a lithium manganese nickel composite oxide having a spinel structure ($Li_xMn_{2-y}Ni_yO_4$), a lithium phosphate having an olivine structure (for example, $Li_xFePO_4$, $Li_xFe_{1-y}Mn_yPO_4$, and $Li_xCoPO_4$), iron sulfate ($Fe_2(SO_4)_3$), or a vanadium oxide (for example $V_2O_5$) can be used in the oxide. It is preferable that x and y described above, are $0<x\leq1$ and $0\leq y\leq1$.

For example, a conductivity polymer material such as polyaniline or polypyrrole, or a disulfide-based polymer material can be used as the polymer. Sulfur (S) or carbon fluoride can also be used as the active material.

Preferred examples of the positive electrode active material include a lithium manganese composite oxide having a high positive electrode voltage ($Li_xMn_2O_4$), a lithium nickel composite oxide ($Li_xNiO_2$), a lithium cobalt composite oxide ($Li_xCoO_2$), a lithium nickel cobalt composite oxide ($Li_xNi_{1-y}Co_yO_2$), a lithium nickel manganese cobalt composite oxide (for example $Li_x(Ni_aMn_bCO_c)O_2$, here, $a+b+c=1$), a lithium manganese nickel composite oxide of a spinel structure ($Li_xMn_{2-y}Ni_yO_4$), a lithium manganese cobalt composite oxide ($Li_xMn_yCo_{1-y}O_2$), and lithium iron phosphate ($Li_xFePO_4$). It is preferable that x and y described above, are $0<x\leq1$ and $0\leq y\leq1$.

It is more preferable that the positive electrode active material is a lithium manganese composite oxide having a spinel structure ($Li_xMn_2O_4$), a lithium nickel manganese cobalt composite oxide having a layered structure (for example $Li_x(Ni_aMn_bCo_c)O_2$, here $a+b+c=1$), and a lithium iron phosphate having an olivine structure ($Li_xFePO_4$), from the viewpoint of high-temperature durability. Such active materials have high structure stability, and are excellent in the reversibility of charge and discharge, and thus, in a combination with the negative electrode active material described above, higher service life performance is obtained, and high high-temperature durability is obtained.

The positive electrode active material is capable of containing single primary particle, secondary particles in which the primary particles are aggregated, or both of the single primary particle and the secondary particles.

An average particle diameter of the primary particles of the positive electrode active material is less than or equal to 1 μm, and is more preferably 0.05 μm to 0.5 μm.

In a case where the electrode for a secondary battery according to the first embodiment is used as the positive electrode, the active material contains at least the titanium-containing composite oxide having at least one of the crystalline structure belonging to the space group Cmca and the crystalline structure belonging to the space group Fmmm, represented by the general formula of $Li_{2+a}M1_{2-b}Ti_{6-c}M2_dO_{14+\delta}$. For this reason, the titanium-containing composite oxide may have only the crystalline structure belonging to the space group Cmca, or may have only the crystalline structure belonging to the space group Fmmm. Alternatively, the titanium-containing composite oxide is capable of having both of the crystalline structure belonging to the space group Cmca and the crystalline structure belonging to the space group Fmmm. Further, the titanium-containing composite oxide may have a crystalline structure belonging to a space group different from the space groups described above, in addition to the crystalline structure belonging to the space groups. In addition, the titanium-containing composite oxide having at least one of the crystalline structure belonging to the space group Cmca and the crystalline structure belonging to the space group Fmmm may be independently used in the positive electrode active material, or one or more types of active materials described above may be simultaneously used as the other positive electrode active material.

In addition, in a case where the electrode for a secondary battery according to the first embodiment is used in the positive electrode, for example, a carbon-based material such as graphite and coke, can be used in the active material of the negative electrode as a counter electrode, in addition to the active materials exemplified in the description of the negative electrode of the electrode for a secondary battery according to the first embodiment, described above.

Further, in a case where the electrode for a secondary battery according to the first embodiment is used as the positive electrode, the primary particles of the titanium-containing composite oxide having at least one of the crystalline structure belonging to the space group Cmca and the crystalline structure belonging to the space group Fmmm, may be in the shape of a sphere or a needle, may be in both shapes, or may be in other shapes.

It is preferable that at least a part of a particle surface of the positive electrode active material, is covered with a carbon material. The carbon material can be in the form of a layer structure, a particle structure, or an aggregate of particles.

It is preferable that a specific surface area of the positive electrode active material is greater than or equal to 0.1 $m^2/g$ and less than or equal to 10 $m^2/g$. The positive electrode active material having a specific surface area of greater than or equal to 0.1 $m^2/g$, is capable of sufficiently ensuring a storing and releasing site of a lithium ion. The positive electrode active material having a specific surface area of less than or equal to 10 $m^2/g$, is capable of increasing the handle ability on the industrial production, and of ensuring excellent charge and discharge cycle performance.

In addition, the secondary battery including the negative electrode using the electrode for a secondary battery according to the first embodiment, a lithium manganese composite oxide ($Li_xMn_2O_4$) positive electrode or a lithium nickel manganese cobalt composite oxide (for example, $Li_x(Ni_aMn_bCo_c)O_2$, here, a+b+c=1) positive electrode, is capable of configuring a 12 V system in 5-series, capable of exhibiting excellent interchangeability with respect to a lead storage battery. Then, the secondary battery including the negative electrode containing the active material, and a lithium iron phosphate ($Li_xFePO_4$) positive electrode, is capable of configuring a 12 V system in 6-series, capable of exhibiting excellent interchangeability with respect to the lead storage battery. According to such a configuration, it is possible to provide the assembled battery and the battery pack, excellent in the input and output performance and the service life performance.

The conductive agent is capable of increasing the collection performance of the active material, and of suppressing the contact resistance with respect to the collector. Examples of the conductive agent include a carbon substance such as acetylene black, carbon black, and black lead.

The binding agent is capable of binding the active material and the conductive agent together. Examples of the binding agent include polytetrafluoroethylene (PTFE), polyvinylidene fluoride (PVdF), an acrylic resin, and fluorine-based rubber.

It is preferable that the positive electrode active material, the conductive agent, and the binding agent in the positive electrode layer are compounded respectively at a ratio of greater than or equal to 80 mass % and less than or equal to 95 mass %, a ratio of greater than or equal to 3 mass % and less than or equal to 18 mass %, and a ratio of greater than or equal to 2 mass % and less than or equal to 17 mass %. The ratio of the conductive agent is set to be greater than or equal to 3 mass %, and thus, is capable of exhibiting the effect described above. The ratio of the conductive agent is set to be less than or equal to 18 mass %, and thus, is capable of reducing the decomposition of a non-aqueous electrolyte on a front surface of the conductive agent, in high-temperature storage. The ratio of the binding agent is set to be greater than or equal to 2 mass %, and thus, is capable of obtaining a sufficient positive electrode intensity. The ratio of the binding agent is set to be less than or equal to 17 mass %, and thus, is capable of decreasing a compounding amount of the binding agent that is an insulating material in the positive electrode, and of decreasing internal resistance.

For example, the positive electrode active material, the conductive agent, and the binding agent are suspended in a solvent that is commonly used, slurry is prepared, and the slurry is applied to the collector, is dried, and then, is pressed, and thus, the positive electrode is produced. In addition, the positive electrode active material, the conductive agent, and the binding agent may be formed into the shape of a pellet to be the positive electrode layer, and the positive electrode layer may be formed on the collector, and thus, the positive electrode may be produced.

A confirmation method of the positive electrode active material, can be the same method as the confirmation method of the negative electrode active material described above.

4) Electrolyte

A non-aqueous electrolyte and an aqueous electrolyte can be used in the electrolyte. For example, a liquid non-aqueous electrolyte prepared by dissolving a first electrolyte in an organic solvent, or a gel-type non-aqueous electrolyte in which a liquid electrolyte and a polymer material are combined, can be used in the non-aqueous electrolyte.

In the liquid non-aqueous electrolyte, it is preferable that the electrolyte is dissolved in an organic solvent, at a concentration of greater than or equal to 0.5 M and less than or equal to 2.5 M.

Examples of the first electrolyte include a lithium salt such as lithium perchlorate ($LiClO_4$), lithium hexafluorophosphate ($LiPF_6$), lithium tetrafluoroborate ($LiBF_4$), lithium arsenic hexafluoride ($LiAsF_6$), lithium trifluoromethanesulfonate ($LiCF_3SO_3$), and bistrifluoromethyl sulfonyl imide lithium [$LiN(CF_3SO_2)_2$], or a mixture thereof. A first electrolyte that is difficult to be oxidized even at a high potential, is preferable, and $LiPF_6$ is the most preferable.

Examples of the organic solvent include cyclic carbonate such as propylene carbonate (PC), ethylene carbonate (EC), and vinylene carbonate; chain carbonate such as diethyl carbonate (DEC), dimethyl carbonate (DMC), and methyl ethyl carbonate (MEC); cyclic ether such as tetrahydrofuran (THF), 2-methyl tetrahydrofuran (2MeTHF), and dioxolan (DOX); chain ether such as dimethoxy ethane (DME) and diethoxy ethane (DEE); or γ-butyrolactone (GBL), acetonitrile (AN), and sulfolane (SL). Such an organic solvent may be independently used, or may be used in the form of a mixed solvent.

Examples of the polymer material include polyvinylidene fluoride (PVdF), polyacrylonitrile (PAN), and polyethylene oxide (PEO).

It is preferable that the organic solvent is a mixed solvent in which at least two or more of the group consisting of propylene carbonate (PC), ethylene carbonate (EC), and diethyl carbonate (DEC) are mixed, or a mixed solvent containing γ-butyrolactone (GBL). By using such a mixed solvent, it is possible to obtain a non-aqueous electrolyte secondary battery excellent in high-temperature performance.

The aqueous electrolyte contains an aqueous solvent and a second electrolyte. In addition, the second electrolyte has at least one type of anion selected from the group consisting of $NO^{3-}$, $Cl^-$, $LiSO^{4-}$, $SO_4^{2-}$, and $OH^-$. One type or two or more types of the anions may be included in the second electrolyte.

A solution containing water, can be used as the aqueous solvent. Here, the solution containing water may be pure water, or may be a mixed solution or a mixed solvent of water and substances other than water.

It is preferable that in the aqueous electrolyte described above, the amount of water solvent (for example, amount of water in the aqueous solvent) is greater than or equal to 1 mol, with respect to 1 mol of a salt that is the solute. It is more preferable that the amount of water solvent is greater than or equal to 3.5 mol, with respect to 1 mol of the salt that is the solute.

An electrolyte that dissociates at the time of being dissolved in the aqueous solvent, and generates the anions described above, can be used as the second electrolyte. In particular, a lithium salt dissociating into Li ions and the anions described above, is preferable. Examples of the lithium salt are capable of including $LiNO_3$, $LiCl$, $Li_2SO_4$, $LiOH$, and the like.

In addition, the lithium salt dissociating into the Li ions and the anions described above, has a comparatively high solubility in the aqueous solvent. For this reason, it is possible to obtain the aqueous electrolyte that has a high anion concentration of 1 M to 10 M, and is excellent in Li ion diffusivity.

5) Separator

The separator, for example, a porous film containing polyethylene, polypropylene, cellulose, or polyvinylidene fluoride (PVdF), or a non-woven fabric of a synthesize resin can be used. It is preferable that the porous film is made of polyethylene or polypropylene, is melted at a constant temperature, and is capable of blocking a current, and thus, is capable of improving safeness.

6) Negative Electrode Terminal

For example, a material having electric stability and conductivity at a potential in a range of greater than or equal to 1 V and less than or equal to 3 V (vs. Li/Li+) with respect to Li, can be used in the negative electrode terminal. Specifically, examples of the material include aluminum or an aluminum alloy having an element such as Mg, Ti, Zn, Mn, Fe, Cu, and Si. It is preferable that the negative electrode terminal is the same material as that of the negative electrode collector, in order to reduce the contact resistance with respect to the negative electrode collector.

7) Positive Electrode Terminal

A material having the electric stability and the conductivity at a potential in a range of 3 V to 4.25 V (vs. Li/Li+) with respect to Li, can be used in the positive electrode terminal. Specifically, examples of the material include aluminum or an aluminum alloy having an element such as Mg, Ti, Zn, Mn, Fe, Cu, and Si. It is preferable that the positive electrode terminal is the same material as that of the positive electrode collector, in order to reduce the contact resistance with respect to the positive electrode collector.

Next, an example of the secondary battery according to the second embodiment will be described with reference to the drawings.

Figure 3:
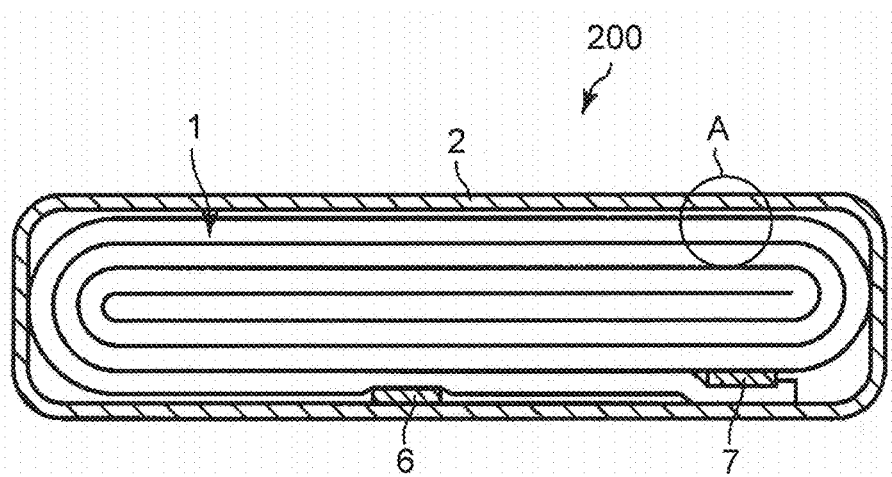
FIG. 3 is a schematic sectional view illustrating a secondary battery of an example according to a second embodiment.
Figure 4:
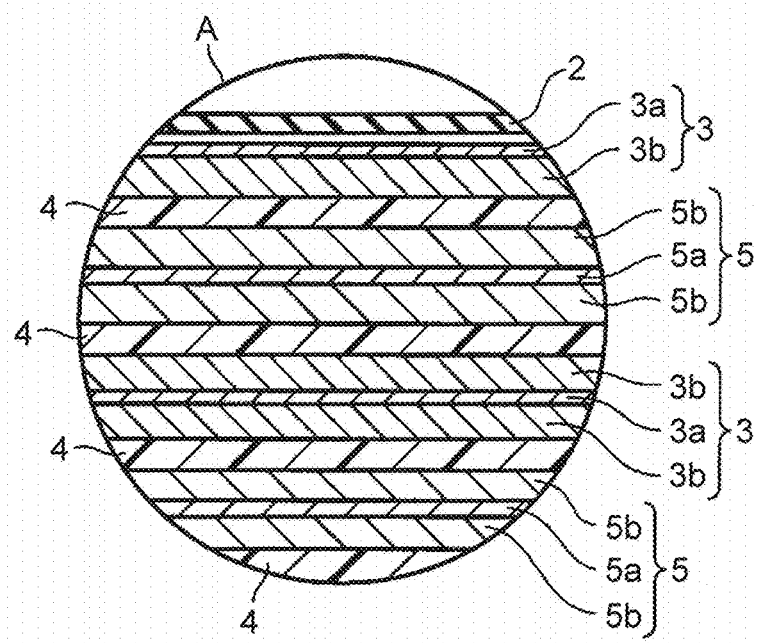
FIG. 4 is an enlarged sectional view of a portion A of the secondary battery of FIG. 3.

FIG. 3 is a schematic sectional view illustrating a secondary battery of an example according to the second embodiment. FIG. 4 is an enlarged sectional view of a portion A of FIG. 3.

A secondary battery 200 illustrated in FIG. 3 and FIG. 4 includes a flat wound electrode group 1.

As illustrated in FIG. 4, the flat wound electrode group 1 includes a negative electrode 3, a separator 4, and a positive electrode 5. The separator 4 is interposed between the negative electrode 3 and the positive electrode 5. Such a flat wound electrode group 1, for example, can be formed by winding a laminate formed by laminating the negative electrode 3, the separator 4, the positive electrode 5, and another separator 4 such that the separator 4 is interposed between the negative electrode 3 and the positive electrode 5, into the shape of a spiral such that the negative electrode 3 is on the outside, as illustrated in FIG. 4, and by performing press molding.

The negative electrode 3 includes a negative electrode collector 3a and a negative electrode layer 3b. In a portion positioned on the outermost shell in the negative electrode 3, the negative electrode layer 3b is formed only on a surface of the negative electrode collector 3a, facing the center of the electrode group, as illustrated in FIG. 4. In the other portion in the negative electrode 3, the negative electrode layer 3b is formed on both surfaces of the negative electrode collector 3a.

In the positive electrode 5, a positive electrode layer 5b is formed on both surfaces of a positive electrode collector 5a.

As illustrated in FIG. 3, in the vicinity of an outer circumferential end of the wound electrode group 1, a negative electrode terminal 6 is connected to the negative electrode collector 3a of the negative electrode 3 on the outermost shell, and a positive electrode terminal 7 is connected to the positive electrode collector 5a of the positive electrode 5 on the inside.

The wound electrode group 1 is stored in a pouched container 2 formed of a laminated film in which a metal layer is interposed between two resin layers.

The negative electrode terminal 6 and the positive electrode terminal 7 extend to the outside from an opening portion of the pouched container 2. For example, the liquid non-aqueous electrolyte is injected from the opening portion of the pouched container 2, and is stored in the pouched container 2.

The pouched container 2 is subjected to heat sealing by interposing the opening portion between the negative electrode terminal 6 and the positive electrode terminal 7, and thus, the wound electrode group 1 and the liquid non-aqueous electrolyte are completely sealed.

The secondary battery according to the second embodiment described above, contains the active material, and thus, is capable of exhibiting excellent input and output performance and excellent service life performance, and of having a high energy density.

In addition, when such a secondary battery, for example, is combined with a 12 V lead storage battery for an automobile, and constructs a motor assist type hybrid car or an idling stop system, it is possible to prevent overdischarge of the lead storage battery at the time of a high load or to design a battery pack voltage according to a voltage variation at the time of regeneration input. This is because voltage drop at the end of the discharge of the secondary battery of the second embodiment, is gentle. A voltage change according to the charge and discharge of the secondary battery is gentle, and thus, it is possible to manage a state of charge (SOC) on the basis of the voltage change. For this reason, voltage management is easily performed at the end of the discharge, and thus, it is possible to preferably use the secondary battery in the system combined with the lead storage battery.

Further, in a case where spinel type lithium titanate ($Li_4Ti_5O_{12}$) is used in the negative electrode, it is necessary to set 6-series such that an average operation potential is low and a compatible voltage with respect to the lead storage battery for an automobile is obtained. In contrast, the active material of the first embodiment is used as the negative electrode active material, and thus, the average operation potential of the negative electrode decreases, and the battery voltage increases. For this reason, even in the case of configuring a cell of the battery pack in 5-series, it is possible to configure the battery pack having a battery voltage with high compatibility with respect to the 12 V lead storage battery for an automobile. That is, the secondary battery of the second embodiment is capable of providing the battery pack with low cost, low resistance, a small size, and a high energy density.

Third Embodiment

According to a third embodiment, an assembled battery is provided. The assembled battery according to the third embodiment includes a plurality of secondary batteries according to the second embodiment.

In the assembled battery according to the third embodiment, each unit cell can be arranged by being electrically connected in series or in parallel, or can be arranged in a combination of serial connection and parallel connection.

For example, the assembled battery according to the third embodiment, is capable of including 6 m secondary batteries provided with the negative electrode containing the active material, the positive electrode containing an iron-containing phosphate compound having an olivine structure, and the non-aqueous electrolyte. Here, m is an integer of greater than or equal to 1.6 m secondary batteries are connected in series, and thus, the assembled battery can be configured. As described in the second embodiment, the secondary battery provided in the assembled battery of this example, is capable of configuring the 12 V system in 6-series, capable of exhibiting excellent interchangeability with respect to the lead storage battery.

For example, the assembled battery according to the third embodiment is capable of including 5n secondary batteries provided with the negative electrode containing the active material, the positive electrode containing at least one type selected from the group consisting of a lithium manganese composite oxide having a spinel structure and a lithium nickel manganese cobalt composite oxide having a layered structure, and the non-aqueous electrolyte. Here, n is an integer of greater than or equal to 1.5n secondary batteries are connected in series, and thus, the assembled battery can be configured. As described in the second embodiment, the secondary battery provided in the assembled battery of this example, is capable of configuring the 12 V system in 5-series, capable of exhibiting excellent interchangeability with respect to the lead storage battery.

As described above, the assembled battery is capable of configuring the 12 V system excellent in the interchangeability with respect to the lead storage battery. For this reason, the assembled battery can be preferably used as an in-car battery. Here, examples of a vehicle on which the assembled battery is mounted, include an automobile of two wheels to four wheels in which an idling stop mechanism is mounted, a hybrid electric vehicle of two wheels to four wheels, an electric vehicle of two wheels to four wheels, an assist bicycle, and the like. The assembled battery, for example, can be provided in an engine room of an automobile.

Next, an example of the assembled battery according to the third embodiment will be described with reference to the drawings.

Figure 5:
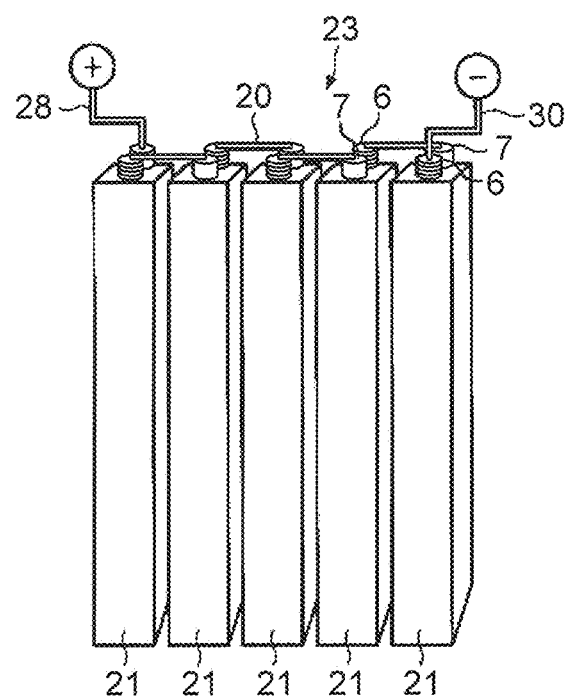
FIG. 5 is a schematic perspective view illustrating an example of an assembled battery according to a third embodiment.

FIG. 5 is a schematic perspective view illustrating an example of the assembled battery according to the third embodiment. An assembled battery 23 illustrated in FIG. 5, includes five unit cells 21. Each of the five unit cells 21 is a rectangular secondary battery of an example according to the second embodiment.

The assembled battery 23 illustrated in FIG. 5, further includes four leads 20. One lead 20 connects the negative electrode terminal 6 of one unit cell 21, and the positive electrode terminal 7 of another unit cell 21, together. Thus, the five unit cells 21 are connected in series by four leads 20. That is, the assembled battery 23 of FIG. 5 is an assembled battery in 5-series.

As illustrated in FIG. 5, the positive electrode terminal 7 of one unit cell 21 of the five unit cells 21, is connected to a positive electrode side lead 28 for external connection. In addition, the negative electrode terminal 6 of one unit cell 21 of the five unit cells 21, is connected to a negative electrode side lead 30 for external connection.

The assembled battery according to the third embodiment includes the secondary battery according to the second embodiment, and thus, is capable of exhibiting excellent input and output performance and excellent service life performance, and has a high energy density.

Fourth Embodiment

According to a fourth embodiment, a battery pack is provided. The battery pack includes the secondary battery according to the second embodiment.

The battery pack according to the fourth embodiment is capable of including one or a plurality of secondary batteries (unit cells) according to the second embodiment described above. The plurality of secondary batteries that can be included in the battery pack according to the fourth embodiment, can be electrically connected in series, in parallel, or in a combination of serial connection and parallel connection. The plurality of secondary batteries are electrically connected together, and thus, the assembled battery can be configured. The battery pack according to the fourth embodiment may include a plurality of assembled batteries. The assembled battery included in the battery pack according to the fourth embodiment, for example, may be the assembled battery according to the third embodiment.

The battery pack according to the fourth embodiment, is capable of further including a protective circuit. The protective circuit controls charge and discharge of the secondary battery. Alternatively, a circuit included in a device (for example, an electronic device, an automobile, or the like)

using the battery pack as a power source, can be used as the protective circuit of the battery pack.

In addition, the battery pack according to the fourth embodiment, is capable of further including an external terminal for energization. The external terminal for energization outputs a current from the secondary battery to the outside, and/or inputs a current into the secondary battery. In other words, when the battery pack is used as the power source, a current is supplied to the outside through the external terminal for energization. In addition, when the battery pack is charged, a charge current (including regeneration energy of power of an automobile or the like) is supplied to the battery pack through the external terminal for energization.

Next, an example of the battery pack according to the fourth embodiment will be described with reference to the drawings.

Figure 6:
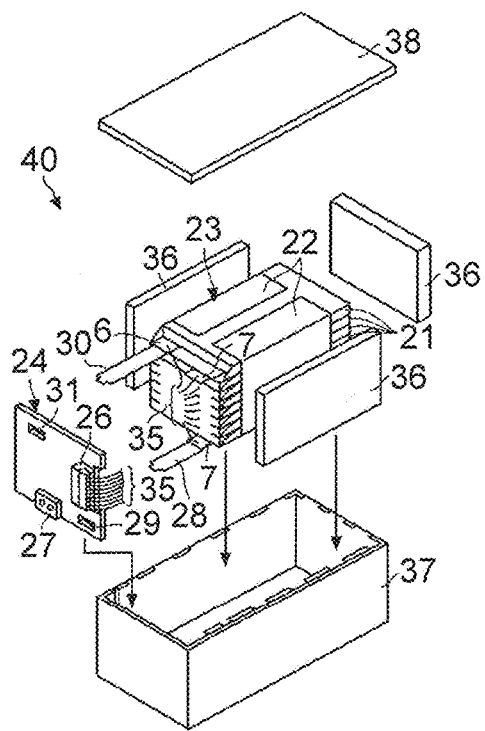
FIG. 6 is an exploded perspective view illustrating a battery pack of an example according to a fourth embodiment.
Figure 7:
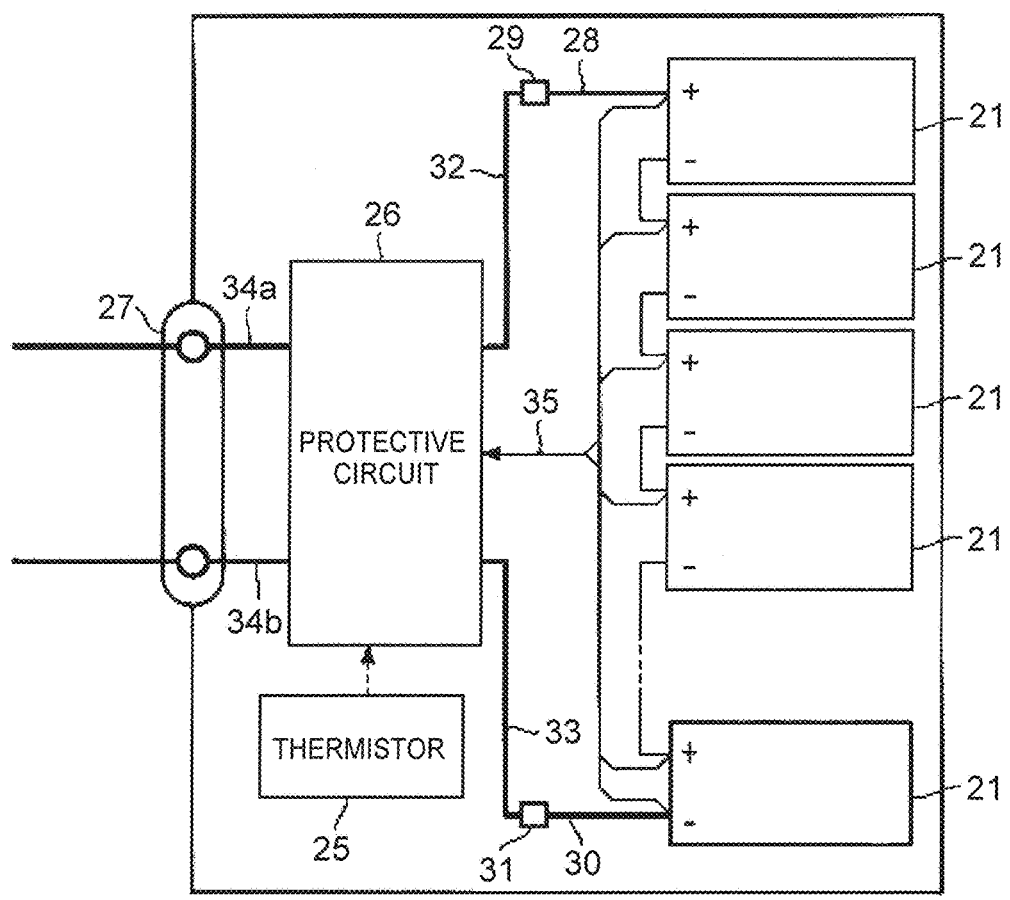
FIG. 7 is a block diagram illustrating an electric circuit of the battery pack of FIG. 6.

FIG. 6 is an exploded perspective view of a battery pack of an example according to the fourth embodiment. FIG. 7 is a block diagram illustrating an electric circuit of the battery pack illustrated in FIG. 6.

A battery pack 40 illustrated in FIG. 6 and FIG. 7, includes a plurality of flat batteries 21 having a structure illustrated in FIG. 3 and FIG. 4. That is, the battery pack 40 illustrated in FIG. 6 and FIG. 7, includes a plurality of secondary batteries of an example according to the first embodiment.

The plurality of unit cells 21 are laminated such that the negative electrode terminal 6 and the positive electrode terminal 7, extending to the outside, are aligned in the same direction, and are fastened by a pressure-sensitive adhesive tape 22, and thus, the assembled battery 23 is configured. Such unit cells 21 are electrically connected to each other in series, as illustrated in FIG. 7.

A printed wiring board 24 is arranged to face a lateral surface of the plurality of unit cells 21, on which the negative electrode terminal 6 and the positive electrode terminal 7 extend. As illustrated in FIG. 7, a thermistor 25, a protective circuit 26, and an external terminal 27 for energization, are mounted on the printed wiring board 24. Furthermore, an insulating plate (not illustrated) for avoiding unnecessary connection with respect to the wiring of the assembled battery 23, is attached onto the surface of the printed wiring board 24, facing the assembled battery 23.

A positive electrode side lead 28 is connected to the positive electrode terminal 7 of the unit cell 21, positioned on the lowermost layer of the assembled battery 23, and a tip end of the positive electrode side lead 28 is inserted and electrically connected to a positive electrode side connector 29 of the printed wiring board 24. A negative electrode side lead 30 is connected to the negative electrode terminal 6 of the unit cell 21, positioned on the uppermost layer of the assembled battery 23, and a tip end of the negative electrode side lead 30 is inserted and electrically connected to the negative electrode side connector 31 of the printed wiring board 24. The connectors 29 and 31 are connected to the protective circuit 26 through each of wirings 32 and 33 formed on the printed wiring board 24.

The thermistor 25 detects the temperature of each of the unit cells 21, and transmits a detection signal to the protective circuit 26. The protective circuit 26 is capable of blocking plus side wiring 34a and minus side wiring 34b between the protective circuit 26 and the external terminal 27 for energization in a predetermined condition. The predetermined condition, for example, is a time when a signal indicating that the temperature of the unit cell 21 is higher than or equal to a predetermined temperature, is received from the thermistor 25. In addition, another example of the predetermined condition is a time when the overcharge, the overdischarge, the overcurrent, or the like of the unit cell 21 is detected. The overcharge or the like is detected with respect to each of the unit cells 21 or the entire unit cell 21. In a case where each of the unit cells 21 is detected, a battery voltage may be detected, or a positive electrode potential or a negative electrode potential may be detected. In the case of the latter, a lithium electrode used as a reference electrode, is inserted into each of the unit cells 21. In the battery pack 40 of FIG. 6 and FIG. 7, wiring 35 for detecting a voltage is connected to each of the unit cells 21, and the detection signal is transmitted to the protective circuit 26 through the wiring 35.

A protective sheet 36 formed of rubber or a resin is arranged on each of three lateral surfaces of the assembled battery 23, excluding the lateral surface on which the positive electrode terminal 7 and the negative electrode terminal 6 protrude.

The assembled battery 23 is stored in a storage container 37, along with each of the protective sheet 36 and the printed wiring board 24. That is, the protective sheet 36 is arranged each of both inner side surfaces of the storage container 37 in a long side direction, and an inner side surface in a short side direction, and the printed wiring board 24 is arranged on the opposite inner side surface in the short side direction. The assembled battery 23 is positioned in a space surrounded by the protective sheet 36 and the printed wiring board 24. A lid 38 is attached to an upper surface of the storage container 37.

Furthermore, the assembled battery 23 may be fixed by using a thermal contraction tape instead of the pressure-sensitive adhesive tape 22. In this case, the protective sheet is arranged on both lateral surfaces of the assembled battery, and is wound with the thermal contraction tape, and then, the thermal contraction tape is subjected to thermal contraction, and thus, the assembled battery is solidified.

The battery pack 40 illustrated in FIG. 6 and FIG. 7, is formed by connecting the plurality of unit cells 21 in series, but in the battery pack according to the fourth embodiment, the plurality of unit cells 21 may be connected in parallel in order to increase battery capacity. Alternatively, the battery pack according to the fourth embodiment may include the plurality of unit cells 21 connected in a combination of serial connection and parallel connection. The combined battery pack 40 can also be further connected in series and/or in parallel.

In addition, the battery pack 40 illustrated in FIG. 6 and FIG. 7, includes the plurality of unit cells 21, but the battery pack according to the fourth embodiment may include one unit cell 21.

In addition, the mode of the battery pack is suitably changed according to the application. The battery pack according to this embodiment is preferably used in an application in which excellent cycle performance is required at the time of taking out a large current. Specifically, the battery pack can also be used as a power source of a digital camera.

Fifth Embodiment

According to a fifth embodiment, a vehicle is provided. The battery pack according to the fourth embodiment is mounted on the vehicle.

In the vehicle according to the fifth embodiment, the battery pack, for example, collects the regeneration energy of the power of the vehicle.

Examples of the vehicle according to the fifth embodiment includes a hybrid electric vehicle of two wheels to four wheels, an electric vehicle of two wheels to four wheels, an assist bicycle, and a railroad vehicle.

A mounting position of the battery pack in the vehicle according to the fifth embodiment is not particularly limited. For example, in a case where the battery pack is mounted on an automobile, the battery pack can be mounted in an engine room of a vehicle, behind a vehicle body, or below a seat.

Next, an example of the vehicle according to the fifth embodiment will be described with reference to the drawings.

Figure 8:
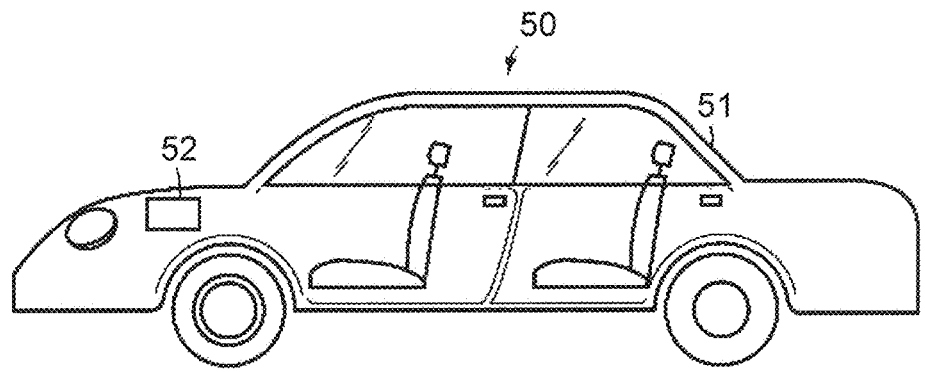
FIG. 8 is a sectional view schematically illustrating a vehicle of an example according to a fifth embodiment.

FIG. 8 is a sectional view schematically illustrating an example of the vehicle according to the fifth embodiment.

A vehicle 50 illustrated in FIG. 8 includes a vehicle main body 51 and a battery pack 52. The battery pack 52 can be the battery pack according to the fourth embodiment.

The vehicle 50 illustrated in FIG. 8 is an automobile of four wheels. For example, a hybrid electric vehicle of two wheels to four wheels, an electric vehicle of two wheels to four wheels, an assist bicycle, and a railroad vehicle can be used as the vehicle 50.

A plurality of battery packs 52 may be mounted on the vehicle 50. In this case, the battery packs 52 may be connected in series, may be connected in parallel, or may be connected in a combination of serial connection and parallel connection.

The battery pack 52 is mounted in an engine room that is positioned in front of the vehicle main body 51. A mounting position of the battery pack 52 is not particularly limited. The battery pack 52 may be mounted behind the vehicle main body 51 or below the seat. The battery pack 52 can be used as a power source of the vehicle 50. In addition, the battery pack 52 is capable of collecting the regeneration energy of the power of the vehicle 50.

Next, an aspect of the vehicle according to the fifth embodiment will be described with reference to FIG. 9.

Figure 9:
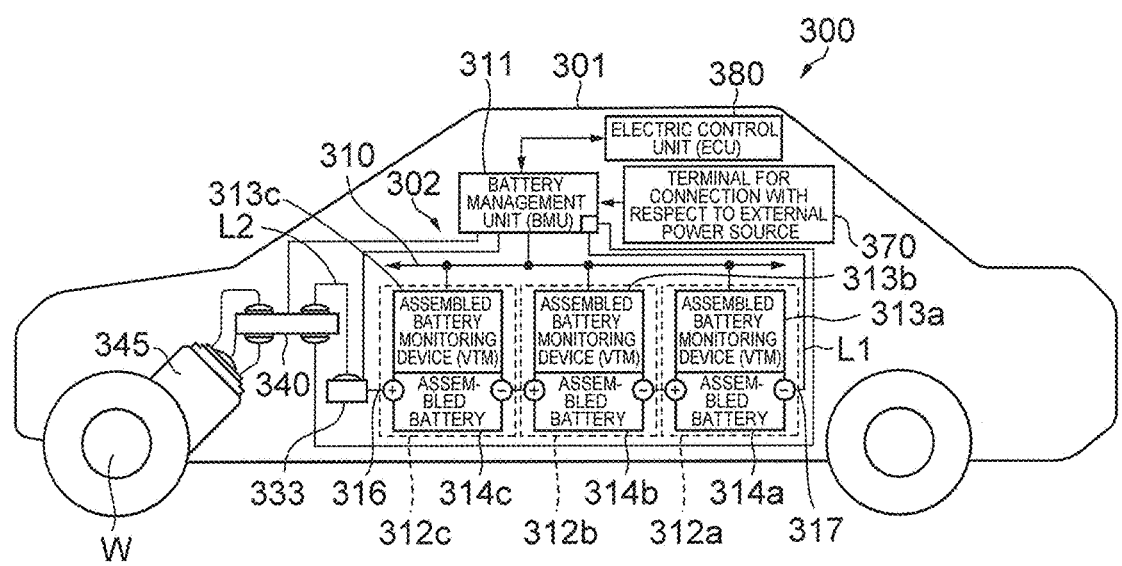
FIG. 9 is a sectional view schematically illustrating a vehicle of an example according to the fifth embodiment.

FIG. 9 is a diagram schematically illustrating another example of the vehicle according to the fifth embodiment. A vehicle 300 illustrated in FIG. 9 is an electric vehicle.

The vehicle 300 illustrated in FIG. 9 includes a vehicle main body 301, a vehicle power source 302, a vehicle electric control unit (ECU) 308 that is a master control unit of the vehicle power source 302, an external terminal (a terminal for connection with respect to an external power source) 370, an inverter 340, and a driving motor 345.

In the vehicle 300, the vehicle power source 302, for example, is mounted in the engine room, behind the vehicle body of the automobile, or below the seat. Furthermore, in the vehicle 300 illustrated in FIG. 9, a mounting location of the vehicle power source 302 is schematically illustrated.

The vehicle power source 302 includes a plurality of (for example, three) battery packs 312a, 312b, and 312c, a battery management unit (BMU) 311, and a communication bus 310.

Three battery packs 312a, 312b, and 312c are electrically connected in series. The battery pack 312a includes an assembled battery 314a and an assembled battery monitoring device (voltage temperature monitoring: VTM) 313a. The battery pack 312b includes an assembled battery 314b and an assembled battery monitoring device 313b. The battery pack 312c includes an assembled battery 314c and an assembled battery monitoring device 313c. The battery packs 312a, 312b, and 312c can be each independently detached, and can be replaced with another battery pack 312.

Each of the assembled batteries 314a to 314c includes a plurality of unit cells that are connected in series. At least one of the plurality of unit cells is the secondary battery according to the second embodiment. Each of the assembled batteries 314a to 314c performs charge and discharge through a positive electrode terminal 316 and a negative electrode terminal 317.

In order to collect information relevant to the maintenance of the vehicle power source 302, the battery management unit 311 performs communication with respect to the assembled battery monitoring devices 313a to 313c, and collects information relevant to the voltage, the temperature, and the like of the unit cells that are included in the assembled batteries 314a to 314c included in the vehicle power source 302.

The communication bus 310 is connected between the battery management unit 311 and the assembled battery monitoring devices 313a to 313c. The communication bus 310 is configured such that a set of communication lines are shared in a plurality of nodes (a battery management unit and one or more assembled battery monitoring devices). The communication bus 310, for example, is a communication bus that is configured on the basis of a control area network (CAN) standard.

The assembled battery monitoring devices 313a to 313c measure the voltage and the temperature of each of the unit cells configuring the assembled batteries 314a to 314c, on the basis of a command according to the communication from the battery management unit 311. However, the temperature can be measured at only a few points per one assembled battery, and it is not necessary to measure the temperature of the entire unit cell.

The vehicle power source 302 can be provided with an electromagnetic contactor for switching the connection between the positive electrode terminal 316 and the negative electrode terminal 317 (for example, a switch device 333 illustrated in FIG. 9). The switch device 333 includes a precharge switch (not illustrated) that is turned on when charge is performed with respect to the assembled batteries 314a to 314c, and a main switch (not illustrated) that is turned on when battery output is supplied to a load. The precharge switch and the main switch include a relay circuit (not illustrated) that is turned on or off according to a signal supplied to a coil that is provided in the vicinity of a switch element.

The inverter 340 converts a direct-current voltage that is input into a high voltage of a three-phase alternating current (AC) for driving a motor. A three-phase output terminal of the inverter 340 is connected to each of three-phase input terminals of the driving motor 345. The inverter 340 controls an output voltage on the basis of a control signal from the vehicle ECU 380 for controlling the battery management unit 311 or the entire vehicle operation.

The driving motor 345 is rotated by the power that is supplied from the inverter 340. The rotation, for example, is transmitted to a wheel axis and a driving wheel W through a differential gear unit.

In addition, even though it is not illustrated, the vehicle 300 includes a regeneration braking mechanism. The regeneration braking mechanism rotates the driving motor 345 at the time of braking the vehicle 300, and converts kinetic energy into the regeneration energy as electric energy. The regeneration energy that is collected by the regeneration braking mechanism is input into the inverter 340, and is converted into a direct current. The direct current is input into the vehicle power source 302.

One terminal of a connection line L1 is connected to the negative electrode terminal 317 of the vehicle power source 302 through a current detection unit (not illustrated) in the battery management unit 311. The other terminal of the connection line L1 is connected to a negative electrode input terminal of the inverter 340.

One terminal of a connection line L2 is connected to the positive electrode terminal 316 of the vehicle power source 302 through the switch device 333. The other terminal of the connection line L2 is connected to a positive electrode input terminal of the inverter 340.

The external terminal 370 is connected to the battery management unit 311. The external terminal 370, for example, can be connected to the external power source.

The vehicle ECU 380 performs collaborative control with respect to the battery management unit 311 along with other devices, in response to manipulation input of a driver or the like, and performs management of the entire vehicle. Data relevant to the maintenance of the vehicle power source 302, such as the residual capacity of the vehicle power source 302, is transmitted between the battery management unit 311 and the vehicle ECU 380 through the communication line.

The vehicle according to the fifth embodiment includes the battery pack according to the fourth embodiment. That is, the vehicle according to the fifth embodiment includes a battery pack having excellent input and output performance and high service life performance, and thus, the vehicle according to the fifth embodiment is excellent in excellent input and output performance and service life performance, and therefore, it is possible to provide a vehicle having high reliability.

Hereinafter examples will be described, but the invention is not limited to the following examples unless departing from the gist of the invention.

EXAMPLES

Example 1

In Example 1, a beaker cell of Example 1 is produced according to the following procedure.

<Preparation of Active Material>

Lithium carbonate ($Li_2CO_3$), sodium carbonate ($Na_2CO_3$), and titanium dioxide ($TiO_2$) are mixed at a molar ratio of 1:1:6, and then, the mixture is molded into the shape of a pellet. The mixture is calcined in a muffle furnace at 1000° C. for 12 hours. Then, a calcined product is pulverized with a hammer mill, and thus, the active material $Li_2Na_2Ti_6O_{14}$ is obtained.

<Production of Electrode>

The active material, acetylene black as the conductive agent, and polyvinylidene fluoride (PVdF) as the binding agent, are added to N-methyl-2-pyrrolidone (NMP), and are mixed, and thus, slurry is prepared. At this time, a mass ratio of Active Material:AcetyleneBlack:PVdF is set to 90:5:5. The slurry is applied onto both surfaces of the collector formed of an aluminum foil having a thickness of 12 μm. A coating film of the slurry is dried, and thus, the active material layer is obtained. After that, the collector and the active material layer are pressed, and thus, an electrode of Example 1 is obtained. Here, an electrode density not including the collector, that is, the density of the active material layer is 2.2 g/cm³.

<Preparation of Liquid Non-Aqueous Electrolyte>

Ethylene carbonate (EC) and diethyl carbonate (DEC) are mixed at a volume ratio of 1:2, and are set to a mixed solvent. $LiPF_6$ having a concentration of 1 M, which is the electrolyte, is dissolved in the mixed solvent, and thus, the liquid non-aqueous electrolyte is obtained.

<Manufacturing of Beaker Cell>

A beaker cell using the electrode produced as described above, as a working electrode, and a lithium metal as a counter electrode and a reference electrode, is produced. The liquid non-aqueous electrolyte obtained as described above, is injected into the beaker cell, and thus, a beaker cell of Example 1 is completed.

The working electrode of Example 1 is analyzed by a powder X-ray diffraction method, and battery performance of Example 1 is measured. A measurement method of the powder X-ray diffraction method is as follows.

<Powder X-Ray Diffraction Method>

The working electrode of Example 1 is pasted to a flat glass sample plate holder, and measurement using the powder X-ray diffraction method, is performed.

Hereinafter, a device and a condition used in the measurement, will be described. A smartLabX-ray source, manufactured by Rigaku Corporation: Cu Target Output: 45 kV 200 mA, Solar Slit: 5° on both of incidence and reception, Step Width (2θ): 0.02 deg, Scan Speed: 20 deg/minute, Semiconductor Detector: D/teX Ultra 250, Sample Plate Holder: a flat glass sample plate holder (a thickness of 0.5 mm), and Measurement Range: a range of $5° \leq 2\theta \leq 90°$.

When a peak intensity ratio is measured, in order to avoid an estimation error according to a data processing method, the removal of the background, the separation or the smoothing of peaks of $K\alpha 1$ and $K\alpha 2$, fitting, and the like are not performed, and the peak intensity ratio is calculated from the maximum value of an intensity of each peak of the actually measured data including a $K\alpha 1$ ray and a $K\alpha 2$ ray that are measured.

<Measurement of Battery Performance>

The beaker cell according to Example 1 is charged in a constant current-constant voltage condition of 0.2 C and 1 V for 10 hours, in an environment of 25° C., and thus, Li insertion with respect to the active material is performed. Next, each of the beaker cells is discharged at a constant current of 0.2 C until the cell voltage reaches 3 V, and thus, Li releasing from the active material is performed. Next, the second charge and discharge is performed in the same condition, and in the second charge and discharge cycle, discharge capacity at the time of performing Li releasing at a constant current of 0.2 C until a cell voltage reaches 3 V, is set to discharge capacity of 0.2 C. Next, while Li insertion is performed in a constant current-constant voltage condition of 0.2 C and 1 V for 10 hours, the Li releasing is performed at a constant current of 10 C until the cell voltage reaches 3 V. At this time, the discharge capacity is set to discharge capacity of 10 C.

Figure 10:
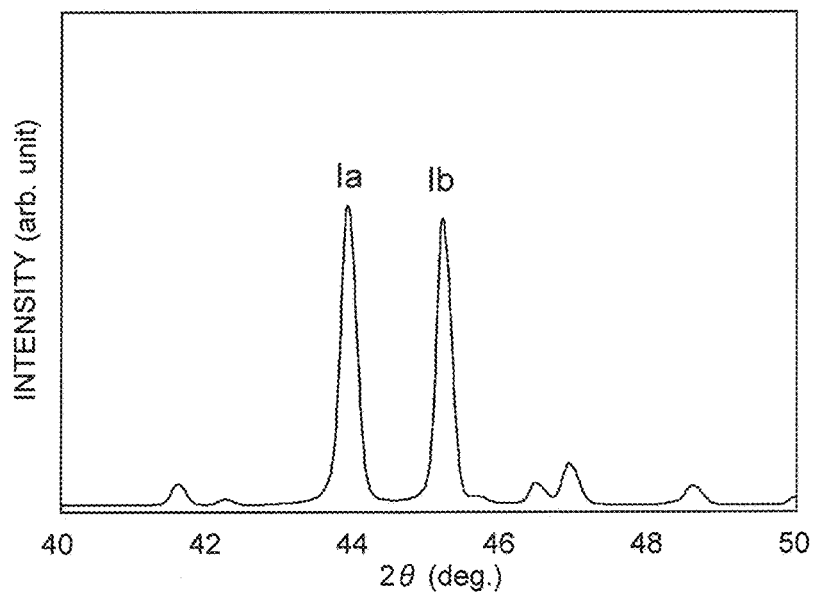
FIG. 10 is a powder X-ray diffraction diagram according to Example 3.
Figure 11:
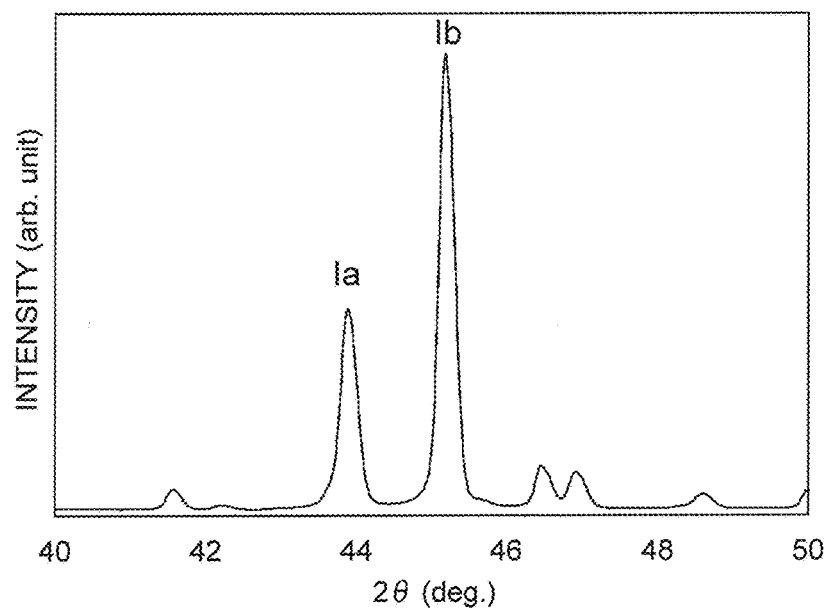
FIG. 11 is a powder X-ray diffraction diagram according to Comparative Example 1.

The composition of the synthesized active material, the intensity ratio Ia/Ib of the electrode according to the X-ray diffraction measurement, and a discharge capacity ratio of 10 C/0.2 C are shown in Table 1. In addition, in Examples 2 to 35 and Comparative Examples 1 to 14, described below, the beaker cell is produced, the composition of the active material, the intensity ratio Ia/Ib of the electrode according to the X-ray diffraction measurement, and the discharge capacity ratio of 10 C/0.2 C are measured, as with Example 1, and are shown in Table 1. In addition, a powder X-ray diffraction diagram of Example 3 is illustrated in FIG. 10, and FIG. 11 illustrates a measurement diagram of the powder X-ray diffraction method of Comparative Example 1.

Example 2

The active material, the electrode, and the beaker cell are produced by the same method as that of Example 1, except that the calcining temperature of the active material is set to 1050° C.

Example 3

The active material, the electrode, and the beaker cell are produced by the same method as that of Example 1, except that the calcining temperature of the active material is set to 1100° C.

Example 4

The active material, the electrode, and the beaker cell are produced by the same method as that of Example 1, except that the calcining temperature of the active material is set to 1150° C.

Example 5

The active material, the electrode, and the beaker cell are produced by the same method as that of Example 1, except that the calcining temperature of the active material is set to 12000

Example 6

Lithium carbonate ($Li_2CO_3$), strontium carbonate ($SrCO_3$), and titanium dioxide ($TiO_2$) are mixed at a molar ratio of 1:1:6, and then, the mixture is molded into the shape of a pellet. The mixture is calcined in a muffle furnace at 1000° C. for 12 hours. Then, a calcined product is pulverized with a hammer mill, and thus, the active material is obtained. The electrode and the beaker cell are produced by the same method as that of Example 1.

Example 7

The active material, the electrode, and the beaker cell are produced by the same method as that of Example 6, except that the calcining temperature of the active material is set to 1050° C.

Example 8

The active material, the electrode, and the beaker cell are produced by the same method as that of Example 6, except that the calcining temperature of the active material is set to 1100° C.

Example 9

The active material, the electrode, and the beaker cell are produced by the same method as that of Example 6, except that the calcining temperature of the active material is set to 1150° C.

Example 10

The active material, the electrode, and the beaker cell are produced by the same method as that of Example 6, except that the calcining temperature of the active material is set to 1200° C.

Example 11

Lithium carbonate ($Li_2CO_3$), sodium carbonate ($Na_2CO_3$), titanium dioxide ($TiO_2$), and diniobium pentoxide ($Nb_2O_5$) are mixed at a molar ratio of 1:0.75:5.5:0.25, and then, the mixture is molded into the shape of a pellet. The mixture is calcined in a muffle furnace at 1000° C. for 12 hours. Then, a calcined product is pulverized with a hammer mill, and thus, the active material is obtained. The electrode and the beaker cell are produced by the same method as that of Example 1.

Example 12

The active material, the electrode, and the beaker cell are produced by the same method as that of Example 11, except that the calcining temperature of the active material is set to 1050° C.

Example 13

The active material, the electrode, and the beaker cell are produced by the same method as that of Example 11, except that the calcining temperature of the active material is set to 1100° C.

Example 14

The active material, the electrode, and the beaker cell are produced by the same method as that of Example 11, except that the calcining temperature of the active material is set to 1150° C.

Example 15

The active material, the electrode, and the beaker cell are produced by the same method as that of Example 11, except that the calcining temperature of the active material is set to 1200° C.

Example 16

Lithium carbonate ($Li_2CO_3$), sodium carbonate ($Na_2CO_3$), calcium carbonate ($CaCO_3$), titanium dioxide ($TiO_2$), and diniobium pentoxide ($Nb_2O_5$) are mixed at a molar ratio of 1:0.5:0.25:5.5:0.25, and then, the mixture is molded into the shape of a pellet. The mixture is calcined in a muffle furnace at 1000° C. for 12 hours. Then, a calcined product is pulverized with a hammer mill, and thus, the active material is obtained. The electrode and the beaker cell are produced by the same method as that of Example 1.

Example 17

The active material, the electrode, and the beaker cell are produced by the same method as that of Example 16, except that the calcining temperature of the active material is set to 1050° C.

Example 18

The active material, the electrode, and the beaker cell are produced by the same method as that of Example 16, except that the calcining temperature of the active material is set to 1100° C.

Example 19

The active material, the electrode, and the beaker cell are produced by the same method as that of Example 16, except that the calcining temperature of the active material is set to 1150° C.

Example 20

The active material, the electrode, and the beaker cell are produced by the same method as that of Example 16, except that the calcining temperature of the active material is set to 1200° C.

Example 21

Lithium carbonate ($Li_2CO_3$), sodium carbonate ($Na_2CO_3$), calcium carbonate ($CaCO_3$), titanium dioxide ($TiO_2$), diniobium pentoxide ($Nb_2O_5$), and divanadium pentoxide ($V_2O_5$) are mixed at a molar ratio of 1:0.75:5.5:0.2:0.05, and then, the mixture is molded into the shape of a pellet. The mixture is calcined in a muffle furnace at 1000° C. for 12 hours. Then, a calcined product is pulverized with a hammer mill, and thus, the active material is obtained. The electrode and the beaker cell are produced by the same method as that of Example 1.

Example 22

The active material, the electrode, and the beaker cell are produced by the same method as that of Example 21, except that the calcining temperature of the active material is set to 1050° C.

Example 23

The active material, the electrode, and the beaker cell are produced by the same method as that of Example 21, except that the calcining temperature of the active material is set to 1100° C.

Example 24

The active material, the electrode, and the beaker cell are produced by the same method as that of Example 21, except that the calcining temperature of the active material is set to 1150° C.

Example 25

The active material, the electrode, and the beaker cell are produced by the same method as that of Example 21, except that the calcining temperature of the active material is set to 1200° C.

Example 26

The beaker cell is produced by the same method as that of Example 1, except that a gel-type non-aqueous electrolyte mixed with 10 wt. % of polyacrylonitrile, is used as the liquid non-aqueous electrolyte used in Example 1.

Example 27

The beaker cell is produced by the same method as that of Example 2, except that a gel-type non-aqueous electrolyte mixed with 10 wt. % of polyacrylonitrile, is used as the liquid non-aqueous electrolyte used in Example 1.

Example 28

The beaker cell is produced by the same method as that of Example 3, except that a gel-type non-aqueous electrolyte mixed with 10 wt. % of polyacrylonitrile, is used as the liquid non-aqueous electrolyte used in Example 1.

Example 29

The beaker cell is produced by the same method as that of Example 4, except that a gel-type non-aqueous electrolyte mixed with 10 wt. % of polyacrylonitrile, is used as the liquid non-aqueous electrolyte used in Example 1.

Example 30

The beaker cell is produced by the same method as that of Example 5, except that a gel-type non-aqueous electrolyte mixed with 10 wt. % of polyacrylonitrile, is used as the liquid non-aqueous electrolyte used in Example 1.

Example 31

The beaker cell is produced by the same method as that of Example 1, except that an aqueous electrolyte in which 2 M of LiCl is dissolved in pure water, is used as the electrolyte.

Example 32

The beaker cell is produced by the same method as that of Example 2, except that an aqueous electrolyte in which 2 M of LiCl is dissolved in pure water, is used as the electrolyte.

Example 33

The beaker cell is produced by the same method as that of Example 3, except that an aqueous electrolyte in which 2 M of LiCl is dissolved in pure water, is used as the electrolyte.

Example 34

The beaker cell is produced by the same method as that of Example 4, except that an aqueous electrolyte in which 2 M of LiCl is dissolved in pure water, is used as the electrolyte.

Example 35

The beaker cell is produced by the same method as that of Example 5, except that an aqueous electrolyte in which 2 M of LiCl is dissolved in pure water, is used as the electrolyte.

Comparative Example 1

The beaker cell is produced by the same method as that of Example 1, except that the calcining temperature of the active material is set to 950° C.

Comparative Example 2

The beaker cell is produced by the same method as that of Example 1, except that the calcining temperature of the active material is set to 1300° C.

Comparative Example 3

The beaker cell is produced by the same method as that of Example 6, except that the calcining temperature of the active material is set to 950° C.

Comparative Example 4

The beaker cell is produced by the same method as that of Example 6, except that the calcining temperature of the active material is set to 1300° C.

Comparative Example 5

The beaker cell is produced by the same method as that of Example 11, except that the calcining temperature of the active material is set to 950° C.

Comparative Example 6

The beaker cell is produced by the same method as that of Example 11, except that the calcining temperature of the active material is set to 1300° C.

Comparative Example 7

The beaker cell is produced by the same method as that of Example 16, except that the calcining temperature of the active material is set to 950° C.

Comparative Example 8

The beaker cell is produced by the same method as that of Example 16, except that the calcining temperature of the active material is set to 1300° C.

Comparative Example 9

The beaker cell is produced by the same method as that of Example 21, except that the calcining temperature of the active material is set to 950° C.

Comparative Example 10

The beaker cell is produced by the same method as that of Example 21, except that the calcining temperature of the active material is set to 1300° C.

Comparative Example 11

The beaker cell is produced by the same method as that of Example 26, except that the calcining temperature of the active material is set to 950° C.

Comparative Example 12

The beaker cell is produced by the same method as that of Example 26, except that the calcining temperature of the active material is set to 1300° C.

Comparative Example 13

The beaker cell is produced by the same method as that of Example 31, except that the calcining temperature of the active material is set to 950° C.

Comparative Example 14

The beaker cell is produced by the same method as that of Example 31, except that the calcining temperature of the active material is set to 1300° C.

TABLE 1

| | Active Material Composition | Space Group | Diffraction Intensity Ratio Ia/Ib | Electrolyte | Discharge capacity ratio (%) of 10 C/0.2 C |
|---|---|---|---|---|---|
| Example 1 | $Li_2Na_2Ti_6O_{14}$ | Fmmm | 0.51 | Liquid Non-Aqueous Electrolyte | 91.5 |
| Example 2 | $Li_2Na_2Ti_6O_{14}$ | Fmmm | 0.81 | Liquid Non-Aqueous Electrolyte | 92.7 |
| Example 3 | $Li_2Na_2Ti_6O_{14}$ | Fmmm | 1.05 | Liquid Non-Aqueous Electrolyte | 93.5 |
| Example 4 | $Li_2Na_2Ti_6O_{14}$ | Fmmm | 1.18 | Liquid Non-Aqueous Electrolyte | 92.6 |
| Example 5 | $Li_2Na_2Ti_6O_{14}$ | Fmmm | 1.95 | Liquid Non-Aqueous Electrolyte | 91.2 |
| Example 6 | $Li_2SrTi_6O_{14}$ | Cmca | 0.52 | Liquid Non-Aqueous Electrolyte | 90.6 |
| Example 7 | $Li_2SrTi_6O_{14}$ | Cmca | 0.85 | Liquid Non-Aqueous Electrolyte | 92.1 |
| Example 8 | $Li_2SrTi_6O_{14}$ | Cmca | 1.03 | Liquid Non-Aqueous Electrolyte | 93.1 |
| Example 9 | $Li_2SrTi_6O_{14}$ | Cmca | 1.19 | Liquid Non-Aqueous Electrolyte | 91.9 |
| Example 10 | $Li_2SrTi_6O_{14}$ | Cmca | 1.95 | Liquid Non-Aqueous Electrolyte | 90.1 |
| Example 11 | $Li_2Na_{1.5}Ti_{5.5}Nb_{0.5}O_{14}$ | Fmmm | 0.50 | Liquid Non-Aqueous Electrolyte | 91.9 |
| Example 12 | $Li_2Na_{1.5}Ti_{5.5}Nb_{0.5}O_{14}$ | Fmmm | 0.82 | Liquid Non-Aqueous Electrolyte | 92.9 |
| Example 13 | $Li_2Na_{1.5}Ti_{5.5}Nb_{0.5}O_{14}$ | Fmmm | 1.06 | Liquid Non-Aqueous Electrolyte | 93.9 |
| Example 14 | $Li_2Na_{1.5}Ti_{5.5}Nb_{0.5}O_{14}$ | Fmmm | 1.17 | Liquid Non-Aqueous Electrolyte | 93.0 |
| Example 15 | $Li_2Na_{1.5}Ti_{5.5}Nb_{0.5}O_{14}$ | Fmmm | 2.00 | Liquid Non-Aqueous Electrolyte | 90.8 |
| Example 16 | $Li_2(Ca_{0.5}Na_{0.5})Ti_{5.5}Nb_{0.5}O_{14}$ | Fmmm | 0.54 | Liquid Non-Aqueous Electrolyte | 92.0 |
| Example 17 | $Li_2(Ca_{0.5}Na_{0.5})Ti_{5.5}Nb_{0.5}O_{14}$ | Fmmm | 0.85 | Liquid Non-Aqueous Electrolyte | 92.9 |
| Example 18 | $Li_2(Ca_{0.5}Na_{0.5})Ti_{5.5}Nb_{0.5}O_{14}$ | Fmmm | 1.09 | Liquid Non-Aqueous Electrolyte | 93.8 |
| Example 19 | $Li_2(Ca_{0.5}Na_{0.5})Ti_{5.5}Nb_{0.5}O_{14}$ | Fmmm | 1.19 | Liquid Non-Aqueous Electrolyte | 93.1 |
| Example 20 | $Li_2(Ca_{0.5}Na_{0.5})Ti_{5.5}Nb_{0.5}O_{14}$ | Fmmm | 1.99 | Liquid Non-Aqueous Electrolyte | 90.9 |
| Example 21 | $Li_2Na_{1.5}Ti_{5.5}V_{0.1}Nb_{0.4}O_{14}$ | Fmmm | 0.56 | Liquid Non-Aqueous Electrolyte | 91.9 |
| Example 22 | $Li_2Na_{1.5}Ti_{5.5}V_{0.1}Nb_{0.4}O_{14}$ | Fmmm | 0.86 | Liquid Non-Aqueous Electrolyte | 92.7 |
| Example 23 | $Li_2Na_{1.5}Ti_{5.5}V_{0.1}Nb_{0.4}O_{14}$ | Fmmm | 1.08 | Liquid Non-Aqueous Electrolyte | 93.8 |
| Example 24 | $Li_2Na_{1.5}Ti_{5.5}V_{0.1}Nb_{0.4}O_{14}$ | Fmmm | 1.20 | Liquid Non-Aqueous Electrolyte | 93.0 |
| Example 25 | $Li_2Na_{1.5}Ti_{5.5}V_{0.1}Nb_{0.4}O_{14}$ | Fmmm | 2.00 | Liquid Non-Aqueous Electrolyte | 90.7 |
| Example 26 | $Li_2Na_2Ti_6O_{14}$ | Fmmm | 0.51 | Gel-Type Non-Aqueous Electrolyte | 90.5 |
| Example 27 | $Li_2Na_2Ti_6O_{14}$ | Fmmm | 0.81 | Gel-Type Non-Aqueous Electrolyte | 91.6 |
| Example 28 | $Li_2Na_2Ti_6O_{14}$ | Fmmm | 1.05 | Gel-Type Non-Aqueous Electrolyte | 92.6 |
| Example 29 | $Li_2Na_2Ti_6O_{14}$ | Fmmm | 1.18 | Gel-Type Non-Aqueous Electrolyte | 91.6 |
| Example 30 | $Li_2Na_2Ti_6O_{14}$ | Fmmm | 1.95 | Gel-Type Non-Aqueous Electrolyte | 90.3 |
| Example 31 | $Li_2Na_2Ti_6O_{14}$ | Fmmm | 0.51 | Aqueous Electrolyte | 92.5 |
| Example 32 | $Li_2Na_2Ti_6O_{14}$ | Fmmm | 0.81 | Aqueous Electrolyte | 93.6 |
| Example 33 | $Li_2Na_2Ti_6O_{14}$ | Fmmm | 1.05 | Aqueous Electrolyte | 94.5 |

TABLE 1-continued

| | Active Material Composition | Space Group | Diffraction Intensity Ratio Ia/Ib | Electrolyte | Discharge capacity ratio (%) of 10 C/0.2 C |
|---|---|---|---|---|---|
| Example 34 | $Li_2Na_2Ti_6O_{14}$ | Fmmm | 1.18 | Aqueous Electrolyte | 93.4 |
| Example 35 | $Li_2Na_2Ti_6O_{14}$ | Fmmm | 1.95 | Aqueous Electrolyte | 92.3 |
| Comparative Example 1 | $Li_2Na_2Ti_6O_{14}$ | Fmmm | 0.46 | Liquid Non-Aqueous Electrolyte | 89.9 |
| Comparative Example 2 | $Li_2Na_2Ti_6O_{14}$ | Fmmm | 2.20 | Liquid Non-Aqueous Electrolyte | 89.1 |
| Comparative Example 3 | $Li_2SrTi_6O_{14}$ | Cmca | 0.47 | Liquid Non-Aqueous Electrolyte | 88.9 |
| Comparative Example 4 | $Li_2SrTi_6O_{14}$ | Cmca | 2.14 | Liquid Non-Aqueous Electrolyte | 88.2 |
| Comparative Example 5 | $Li_2Na_{1.5}Ti_{5.5}Nb_{0.5}O_{14}$ | Fmmm | 0.45 | Liquid Non-Aqueous Electrolyte | 89.9 |
| Comparative Example 6 | $Li_2Na_{1.5}Ti_{5.5}Nb_{0.5}O_{14}$ | Fmmm | 2.11 | Liquid Non-Aqueous Electrolyte | 89.3 |
| Comparative Example 7 | $Li_2(Ca_{0.5}Na_{0.5})Ti_{5.5}Nb_{0.5}O_{14}$ | Fmmm | 0.46 | Liquid Non-Aqueous Electrolyte | 89.9 |
| Comparative Example 8 | $Li_2(Ca_{0.5}Na_{0.5})Ti_{5.5}Nb_{0.5}O_{14}$ | Fmmm | 2.13 | Liquid Non-Aqueous Electrolyte | 89.4 |
| Comparative Example 9 | $Li_2Na_{1.5}Ti_{5.5}V_{0.1}Nb_{0.4}O_{14}$ | Fmmm | 0.45 | Liquid Non-Aqueous Electrolyte | 89.8 |
| Comparative Example 10 | $Li_2Na_{1.5}Ti_{5.5}V_{0.1}Nb_{0.4}O_{14}$ | Fmmm | 2.11 | Liquid Non-Aqueous Electrolyte | 89.8 |
| Comparative Example 11 | $Li_2Na_2Ti_6O_{14}$ | Fmmm | 0.46 | Gel-Type Non-Aqueous Electrolyte | 88.7 |
| Comparative Example 12 | $Li_2Na_2Ti_6O_{14}$ | Fmmm | 2.20 | Gel-Type Non-Aqueous Electrolyte | 88.2 |
| Comparative Example 13 | $Li_2Na_2Ti_6O_{14}$ | Fmmm | 0.46 | Aqueous Electrolyte | 90.3 |
| Comparative Example 14 | $Li_2Na_2Ti_6O_{14}$ | Fmmm | 2.20 | Aqueous Electrolyte | 89.9 |

From the results of Table 1, the intensity ratio Ia/Ib is set to be in a range of $0.5 \leq Ia/Ib \leq 2$, and thus, it is known that the electrode for a secondary battery excellent in the input and output properties, can be obtained.

Several embodiments of the invention have been described, but the embodiments are described as an example, and are not intended to limit the scope of the invention. Such novel embodiments can be carried out in other various forms, and various omissions, substitutions, and changes can be performed within a range not departing from the gist of the invention. Such embodiments and the modifications thereof are included in the scope and the gist of the invention, and are included in the invention described in the claims and the equivalent scope thereof.

EXPLANATIONS OF LETTERS OR NUMERALS

100 ELECTRODE FOR SECONDARY BATTERY
101 COLLECTOR
102 ACTIVE MATERIAL MIXTURE LAYER
200 SECONDARY BATTERY
1 ELECTRODE GROUP
2 CONTAINER
3 NEGATIVE ELECTRODE
3a NEGATIVE ELECTRODE COLLECTOR
3b NEGATIVE ELECTRODE LAYER
4 SEPARATOR
5 POSITIVE ELECTRODE
5a POSITIVE ELECTRODE COLLECTOR
5b POSITIVE ELECTRODE LAYER
6 NEGATIVE ELECTRODE TERMINAL
7 POSITIVE ELECTRODE TERMINAL
300 BATTERY PACK
20 LEAD
21 UNIT CELL
22 PRESSURE-SENSITIVE ADHESIVE TAPE
23 ASSEMBLED BATTERY
24 PRINTED WIRING BOARD
25 THERMISTOR
26 PROTECTIVE CIRCUIT
27 TERMINAL FOR ENERGIZATION
28 POSITIVE ELECTRODE SIDE LEAD
29 POSITIVE ELECTRODE SIDE CONNECTOR
30 NEGATIVE ELECTRODE SIDE LEAD
31 NEGATIVE ELECTRODE SIDE CONNECTOR
32, 33 WIRING
34a PLUS SIDE WIRING
34b MINUS SIDE WIRING
35 WIRING FOR DETECTING VOLTAGE
36 PROTECTION SHEET
37 STORAGE CONTAINER
38 LID

What is claimed is:

1. An electrode for a secondary battery, comprising:
a current collector; and
an active material-containing layer comprising active materials which comprise titanium-containing composite oxide having an orthorhombic crystal structure and a formula $Li_{2+a}M1_{2-b}Ti_{6-c}M2_dO_{14+\delta}$,
wherein the $Li_{2+a}M1_{2-b}Ti_{6-c}M2_dO_{14+\delta}$ in the active material-containing layer has an intensity ratio Ia/Ib in an X-ray diffraction pattern of the active material-containing layer, the Ia and the Ib being obtained by powder X-ray diffraction method using Cu-Kα ray, the intensity ratio being in a range of $0.5 \leq Ia/Ib \leq 2$, the Ia being the strongest intensity of a diffraction peak among diffraction peaks appearing in a range of $42° \leq 2\theta \leq 44°$, and the Ib being the strongest intensity of a diffraction peak among different peaks appearing in a range of $44° < 2\theta \leq 48°$, and
wherein
M1 is at least one selected from the group consisting of Sr, Ba, Ca, Mg, Na, Cs, Kb, and K,
M2 is at least one selected from the group consisting of Zr, Sn, V, Nb, Ta, Mo, Fe, Co, Cr, Mn, Ni, and Al,
a is in a range of $0 \leq a \leq 6$,
b is in a range of $0 \leq b < 2$,
c is in a range of $0 \leq c < 6$,
d is in a range of $0 \leq d < 6$, and
δ is in a range of $-0.5 \leq \delta \leq 0.5$.

2. The electrode of claim 1, wherein the intensity ratio Ia/Ib is in a range of $0.8 \leq Ia/Ib \leq 1.2$.

3. The electrode claim 1, wherein the titanium-containing composite oxide is a space group Cmca and/or a space group Fmmm.

4. The electrode of claim 1, wherein the active material has a particle shape and at least one part of the active material surface comprises a carbon containing layer.

5. A secondary battery, comprising;
a positive electrode;
a negative electrode; and
an electrolyte, wherein the negative electrode is the electrode comprising a current collector and an active material-containing layer comprising active materials which comprise titanium-containing composite oxide having an orthorhombic crystal structure and a formula $Li_{2+a}M1_{2-b}Ti_{6-c}M2_dO_{14+\delta}$, wherein the $Li_{2+a}M1_{2-b}Ti_{6-c}M2_dO_{14+\delta}$ in the active material-containing layer has an intensity ratio Ia/Ib in an X-ray diffraction pattern of the active material-containing layer, the Ia and the Ib being obtained by powder X-ray diffraction method using Cu-Kα ray, the intensity ratio being in a range of 0.5≤Ia/Ib≤2, the Ia being the strongest intensity of a diffraction peak among diffraction peaks appearing in a range of 42° ≤2θ≤44°, and the Ib being the strongest intensity of a diffraction peak among diffraction peaks appearing in a range of 44° <2θ≤48°, and wherein M1 is at least one selected from the group consisting of Sr, Ba, Ca, Mg, Na, Cs, Rb, and K, M2 is at least one selected from the group consisting of Zr, Sn, V, Nb, Ta, Mo, V, Y, Fe, Co, Cr, Mn, Ni, and Al, a is in a range of 0≤a≤6, b is in a range of 0≤b<2, c is in a range of 0≤c<6, d is in a range of 0≤d<6, and δ is in a range of −0.5≤δ≤0.5.

6. The secondary battery of 5, wherein the positive electrode comprise positive active materials which are at least one selected from the group consisting of $LiFePO_4$, $LiMnPO_4$, $LiMn_{1-x}Fe_xPO_4$ (0<x≤0.5), $LiFeSO_4F$, $LiNi_{s-}Co_tMn_{1-s-t}O_2$, (0<s<1, 0<t<1, and 0<(1−s−t)<1), $LiMn_2O_4$, and $LiMn_{1.5}Ni_{0.5}O_4$.

7. A secondary battery, comprising:

a positive electrode;

a negative electrode; and an electrolyte, wherein the positive electrode is the electrode comprising a current collector and an active material-containing layer comprising active materials which comprise titanium-containing composite oxide having an orthorhombic crystal structure and a formula $Li_{2+a}M1_{2-b}Ti_{6-c}M2_dO_{14+\delta}$, wherein the $Li_{2+a}M1_{2-b}Ti_{6-c}M2_dO_{14+\delta}$ in the active material-containing layer has an intensity ratio Ia/Ib in an X-ray diffraction pattern of the active material-containing layer, the Ia and the Ib being obtained by powder X-ray diffraction method using Cu-Kα ray, the intensity ratio being in a range of 0.5≤Ia/Ib≤2, the Ia being the strongest intensity of a diffraction peak among diffraction peaks appearing in a range of 42° ≤2θ≤44°, and the Ib being the strongest intensity of a diffraction peak among diffraction peaks appearing in a range of 44° <2θ≤48°, and wherein M1 is at least one selected from the group consisting of Sr, Ba, Ca, Mg, Na, Cs, Rb, and K, M2 is at least one selected from the group consisting of Zr, Sn, V, Nb, Ta, Mo, W, Y, Fe, Co, Cr, Mn, Ni, and Al, a is in a range of 0≤a≤6, b is in a range of 0≤b<2, c is in a range of 0≤c<6, d is in a range of 0≤d<6, and δ is in a range of −0.5≤δ≤0.5.

8. A battery pack, comprising:

a plurality of secondary batteries comprising a positive electrode, a negative electrode and an electrolyte, wherein at least one of the positive electrode and the negative electrode is the electrode comprising a current collector and an active material-containing layer comprising active materials which comprise titanium-containing composite oxide having an orthorhombic crystal structure and a formula $Li_{2+a}M1_{2-b}Ti_{6-c}M2_dO_{14+\delta}$, wherein the $Li_{2+a}M1_{2-b}Ti_{6-c}M2_dO_{14+\delta}$ in the active material-containing layer has an intensity ratio Ia/Ib in an X-ray diffraction pattern of the active material-containing layer, the Ia and the Ib being obtained by powder X-ray diffraction method using Cu-Kα ray, the intensity ratio being in a range of 0.5≤Ia/Ib≤2, the Ia being the strongest intensity of a diffraction peak among diffraction peaks appearing in a range of 42° ≤2θ≤44°, and the Ib being the strongest intensity of a diffraction peak among diffraction peaks appearing in a range of 44° <2θ≤48°, and wherein M1 is at least one selected from the group consisting of Sr, Ba, Ca, Mg, Na, Cs, Rb, and K, M2 is at least one selected from the group consisting of Zr, Sn, V, Nb, Ta, Mo, W, Y, Fe, Co, Cr, Mn, Ni, and Al, a is in a range of 0≤a≤6, b is in a range of 0≤b<2, c is in a range of 0≤c<6, d is in a range of 0≤d<6, and δ is in a range of −0.5≤δ≤0.5.

9. The pack of claim 8, further comprising:

an external terminal configured for energization and a protective circuit.

10. The pack of claim 9, wherein the battery packs are connected electrically to each other in series, in parallel, or in a combination of series connection and parallel connection.

11. A vehicle, comprising:

a plurality of battery packs including a plurality of secondary batteries comprising a positive electrode, a negative electrode, and an electrolyte, wherein at least one of the positive electrode and the negative electrode is the electrode comprising a current collector and an active material-containing layer comprising active materials which comprise titanium-containing composite oxide having an orthorhombic crystal structure and a formula $Li_{2+a}M1_{2-b}Ti_{6-c}M2_dO_{14+\delta}$, wherein the $Li_{2+a}M1_{2-b}Ti_{6-c}M2_dO_{14+\delta}$ in the active material-containing layer has an intensity ratio Ia/Ib in an X-ray diffraction pattern of the active material-containing layer, the Ia and the Ib being obtained by powder X-ray diffraction method using Cu-Kα ray, the intensity ratio being in a range of 0.5≤Ia/Ib≤2, the Ia being the strongest intensity of a diffraction peak among diffraction peaks appearing in a range of 42° ≤2θ≤44°, and the Ib being the strongest intensity of a diffraction peak among diffraction peaks appearing in a range of 44° <2θ≤48°, wherein M1 is at least one selected from the group consisting of Sr, Ba, Ca, Mg, Na, Cs, Rb, and K, M2 is at least one selected from the group consisting of Zr, Sn, V, Nb, Ta, Mo, W, Y, Fe, Co, Cr, Mn, Ni, and Al, a is in a range of 0≤a≤6, b is in a range of 0≤b<2, c is in a range of 0≤c<6, d is in a range of 0≤d<6, and δ is in a range of −0.5≤δ≤0.5.

12. The vehicle of claim 11, further comprising:
a mechanism configured to convert kinetic energy of the vehicle into regenerative energy.

13. The secondary battery of claim 5, wherein the intensity ratio Ia/Ib is in a range of $0.8 \leq Ia/Ib \leq 1.2$.

14. The secondary battery of claim 7, wherein the intensity ratio Ia/Ib is in a range of $0.8 \leq Ia/Ib \leq 1.2$.

15. The pack of claim 8, wherein the intensity ratio Ia/Ib is in a range of $0.8 \leq Ia/Ib \leq 1.2$.

16. The vehicle of claim 11, wherein the intensity ratio Ia/Ib is in a range of $0.8 \leq Ia/Ib \leq 1.2$.

17. The electrode of claim 1, wherein the intensity ratio Ia/Ib is in within a range of $0.85 \leq Ia/Ib \leq 2.0$.

18. The secondary battery of claim 5, wherein the intensity ratio Ia/Ib is in a range of $0.85 \leq Ia/Ib \leq 2.0$.

19. The secondary battery of claim 7, wherein the intensity ratio Ia/Ib is in within a range of $0.85 \leq Ia/Ib \leq 2.0$.

20. The electrode of claim 1, wherein M1 is at least one selected from the group consisting of Sr, Ca, Mg, Cs, Rb, and K.

\* \* \* \* \*